United States Patent
Kato et al.

(10) Patent No.: US 8,718,162 B2
(45) Date of Patent: May 6, 2014

(54) RECEPTION DEVICE, RECEPTION METHOD, AND RECEPTION PROGRAM

(75) Inventors: Katsuya Kato, Osaka (JP); Takashi Yoshimoto, Osaka (JP); Ryota Yamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 38 days.

(21) Appl. No.: 13/514,233

(22) PCT Filed: Aug. 11, 2010

(86) PCT No.: PCT/JP2010/063625
§ 371 (c)(1),
(2), (4) Date: Jun. 6, 2012

(87) PCT Pub. No.: WO2011/070822
PCT Pub. Date: Jun. 16, 2011

(65) Prior Publication Data
US 2012/0243628 A1  Sep. 27, 2012

(30) Foreign Application Priority Data

Dec. 11, 2009 (JP) ................ P2009-281455

(51) Int. Cl.
*H04K 1/10* (2006.01)
*H04L 27/28* (2006.01)

(52) U.S. Cl.
USPC .................................................. 375/260

(58) Field of Classification Search
USPC .......................................... 375/260; 455/59
See application file for complete search history.

(56) References Cited

U.S. PATENT DOCUMENTS

| 2004/0062317 | A1 | 4/2004 | Uesugi et al. | |
|---|---|---|---|---|
| 2004/0091057 | A1* | 5/2004 | Yoshida | 375/260 |
| 2004/0247038 | A1* | 12/2004 | Uesugi et al. | 375/260 |
| 2005/0094740 | A1* | 5/2005 | Borran et al. | 375/267 |
| 2012/0099679 | A1 | 4/2012 | Yamada et al. | |

FOREIGN PATENT DOCUMENTS

| JP | 2004-221702 A | 8/2004 |
|---|---|---|
| JP | 2010-288140 A | 12/2010 |
| JP | 2011-109238 A | 6/2011 |

OTHER PUBLICATIONS

Katsuya Kato, Ryota Yamada, Takashi Yoshimoto, Kazuyuki Shimezawa, Minoru Kubota, Naoki Okamoto, Advance Image & Telecommunication Laboratories, Corporate R&D Group, Sharp Corporation, Japan, IEEE, Personal, Indoor and Mobile Radio Communications, Sep. 13-16, 2009.*

International Search Report, dated Nov. 16, 2010 issued in PCT/JP2010/063625.

(Continued)

*Primary Examiner* — Chieh M Fan
*Assistant Examiner* — Tanmay Shah
(74) *Attorney, Agent, or Firm* — Birch, Stewart, Kolasch & Birch, LLP

(57) ABSTRACT

A channel estimator estimates a channel estimation value. A symbol replica generator generates a symbol replica that is a modulation symbol of the information demodulated. A signal extractor extracts, in a plurality of time durations, each of subcarrier elements of the reception signal from which an interference is cancelled, based on the channel estimation and the symbol replica. A demodulator demodulates signals on the subcarrier elements of the reception signal, based on signals in the plurality of time durations which are extracted by the signal extractor.

9 Claims, 14 Drawing Sheets

(56) References Cited

OTHER PUBLICATIONS

Kato et al., "Iterative Receiver Employing Turbo Equalization for Scattered Pilot OFDM System in Fast Fading Environments with Multipath Delay Greater than GI", The 2008 Institute of Electronics, Information and Communication Engineers General conference, Mar. 18, 2008, B-5-29.

Kato et al., "Multipath Division Turbo Equalization with Block Inter-Carrier Inteference Cancellation with Low Sensitivity of Residual Error Caused by Soft Replica", IEICE Technical Report, Nov. 19, 2009, vol. 109, No. 305, pp. 133-138. RCS2009-155(Nov. 2009).

Yamada et al., "Performance Comparison of MC-CDM Systems with Frequency and Time Domain Iterative MCI Canceller for Delay Spread", IEICE Communications Society Conference Koen Ronbunshu 1, Aug. 29, 2007, p. 376, B-5-54.

Yamada et al., "Study on Multipath Division Turbo Equalization with Block ICI Cancellation for MIMO transmission", IEICE Technical Report, Dec. 10, 2009, vol. 109, No. 341, pp. 43-48, RCS2009-174(Dec. 2009).

Search Report from the Eurasian Patent Office for Application No. 201290471 mailed Feb. 4, 2013.

Ito et al., "Scattered Pilot OFDM Reception Employing Turbo Interference Cancellation for ICI Caused by Fast Fading Fluctuations," The Institute of Electronics, Information and Communication Engineers, Technical Report, vol. 103, No. 203, Jul. 10, 2003, pp. 21-26 (8 pages).

Japanese Notice of Reasons for Rejection, dated May 21, 2013, for Japanese Application No. 2009-281455, with English translation.

\* cited by examiner

RECEPTION DEVICE, RECEPTION METHOD, AND RECEPTION PROGRAM

TECHNICAL FIELD

The present invention relates to a reception device, a reception method, and a reception program.

Priority is claimed on Japanese Patent Application No. 2009-281455, filed Dec. 11, 2009, the content of which is incorporated herein by reference.

BACKGROUND ART

Regarding wireless communication, especially in case of broadband transmission, in addition to a preceding path to be received first, there is a path that arrives delayed by way of reflection from obstacles, such as buildings or mountains, thereby causing ISI (Inter-Symbol Interference). Such environments that multiple paths arrive are called multi-path environments. In case of multicarrier transmission, such as OFDM (Orthogonal Frequency Division Multiplexing), OFDMA (Orthogonal Frequency Division Multiple Access), or MC-CDM (Multi Carrier-Code Division Multiplexing), a guard interval (GI) is added to a multicarrier time-domain signal, thereby preventing ISI due to a delayed path whose delay is within the GI. If there is a delayed path whose delay exceeds the GI, the periodicity of FFT (Fast Fourier Transform) is lost, thereby causing ICI (Inter-Carrier Interference) in addition to the ISI. Additionally, if a reception device moves at the high speed, a channel variation in one OFDM symbol is large, thereby also causing ICI. The ISI and ICI significantly deteriorate reception performance.

Non-Patent Document 1 discloses turbo equalization technology. Specifically, Non-Patent Document 1 discloses that replicas of ISI and ICI are generated based on bit log likelihood ratios (LLR) of the results of error correction decoding, and the generated replicas are cancelled from the reception signal to suppress the ISI and ICI, thereby performing suppression of ISI and ICI and optimal detection on the signal remaining after the cancelling.

CITATION LIST

Non-Patent Document

[Non-Patent Document 1] Katsuya KATO, Satoshi SUYAMA, Hiroshi SUZUKI, Kazuhiko FUKAWA, "Iterative Receiver Employing Turbo Equalization for Scattered Pilot OFDM System in Fast Fading Environments with Multipath Delay Greater than GI", The 2008 Institute of Electronics, Information and Communication Engineers General Conference, B-5-29, March, 2008

DISCLOSURE OF THE INVENTION

Problems to be Solved by the Invention

Regarding the technology disclosed in the Non-Patent Document 1, however, the optimal detection is performed for each subcarrier, thereby causing an increase in the amount of calculation. Specifically, the technology disclosed in the Non-Patent Document 1 has had a problem in that the order of the multiplication number of times required for the detection process for each subcarrier is O(N) (N denotes the number of FFT points, i.e., the order of the number of FFT points), and therefore the entire order is $O(N^2)$. Additionally, the technology disclosed in the Non-Patent Document 1 has had a problem in that the order of the multiplication number of times to generate the optimal detection filter is $O(N^2 \log_2 N)$, thereby requiring a great amount of memory to store these data.

Thus, the technologies of the related art has had a demerit in that the amount of calculation increases when information is detected from a reception signal under the fast fading environments in which there is a delayed path whose delay exceeds the GI.

The present invention has been made in view of the above situations, and provides a reception device, a reception method, and a reception program, which can prevent an increase in the amount of calculation when information is detected from a reception signal under the fast fading environments in which there is a delayed path whose delay exceeds the GI.

Means for Solving the Problems (1) The present invention has been made to solve the above problems. The present invention is a reception device configured to demodulate information from a reception signal. The reception device includes: a channel estimator configured to estimate a channel estimation value; a symbol replica generator configured to generate a symbol replica that is a modulation symbol of the information demodulated; a signal extractor configured to extract, in a plurality of time durations, each of subcarrier elements of the reception signal from which an interference is cancelled, based on the channel estimation and the symbol replica; and a demodulator configured to demodulate signals on the subcarrier elements of the reception signal, based on signals in the plurality of time durations which are extracted by the signal extractor.

According to the above configuration, the reception device extracts each subcarrier element of the reception signal from which interference is cancelled, and demodulates a signal on each subcarrier element extracted. Thereby, the reception device can prevent an increase in the amount of calculation.

(2) Additionally, regarding the reception device according to the present invention, the signal extractor includes: a filter unit configured to generate a reception signal replica that is a replica of the reception signal in a time domain, based on the channel estimation value and the symbol replica; a subtractor configured to subtract the reception signal replica from the reception signal; a plurality of duration extractors configured to extract signals in the plurality of time durations from a signal generated by subtraction by the subtractor; a time-to-frequency converter configured to convert, into frequency domain signals, each of the signals in the plurality of time durations, which are extracted by the plurality of duration extractors; and a plurality of reconstructors configured to generate a plurality of replica signals of a desired signal based on the channel estimation value and the symbol replica, add the plurality of replica signals of the desired signal to the frequency domain signals generated by conversion by the time-to-frequency converter, and extract, in the plurality of time durations, each of subcarrier elements of the reception signal.

(3) Additionally, regarding the reception device according to the present invention, the signal extractor includes: a filter unit configured to generate a reception signal replica that is a replica of the reception signal in a time domain, based on the channel estimation value and the symbol replica; a plurality of duration extractors configured to extract signals in the plurality of time durations from the reception signal and the reception signal replica; a time-to-frequency converter configured to convert, into frequency domain signals, a reception signal and a reception signal replica in each of the plurality of time durations, which are extracted by the plurality of duration extractors; a subtractor configured to subtract the reception signal replica from the frequency domain signals generated by conversion by the time-to-frequency converter; and a plurality of reconstructors configured to generate a plurality of replica signals of a desired signal based on the channel estimation value and the symbol replica, add the plurality of replica signals of the desired signal to a signal generated by subtraction by the subtractor, and extract, in the plurality of time durations, each of subcarrier elements of the reception signal.

(4) Additionally, regarding the reception device according to the present invention, the filter unit is configured to generate the reception signal replica based on the symbol replica subjected to frequency-to-time conversion and the channel estimation value.

(5) Additionally, regarding the reception device according to the present invention, the plurality of duration extractors is configured to set a start of one of two time durations from which signals are to be extracted, as corresponding to a start of a preceding wave, and set an end of the other one of the two time durations as corresponding to an end of a signal on a maximum delay path.

(6) Additionally, regarding the reception device according to the present invention, the plurality of reconstructors is configured to extract subcarrier elements of the frequency domain signals generated by conversion by the time-to-frequency converter, and add to signals on the subcarrier elements extracted, subcarrier elements of the plurality of replica signals of the desired signal.

(7) Additionally, regarding the reception device according to the present invention, the plurality of reconstructors is configured to extract subcarrier elements of the frequency domain signals generated by conversion by the time-to-frequency converter, and add to signals on the subcarrier elements extracted, elements of subcarriers close to subcarriers that are subcarrier elements of the plurality of replica signals of the desired signal.

(8) Additionally, regarding the reception device according to the present invention, the reception device further includes a plurality of antennas, and performs communication with a transmission device, using an MIMO transmission scheme.

(9) Additionally, regarding the reception device according to the present invention, the demodulator is configured to perform MIMO separation based on the channel estimation value.

(10) Additionally, regarding the reception device according to the present invention, the reception device is configured to receive, as the reception signal, a plurality of signal of a plurality of streams that are signal streams transmitted from each of the plurality of antennas included in a transmission device. The signal extractor includes: a filter unit configured to generate a reception signal replica that is a replica of the reception signal in a time domain, based on the channel estimation value and the symbol replica; a subtractor configured to subtract the reception signal replica from the reception signal; a plurality of duration extractors configured to extract signals in the plurality of time durations from a signal generated by subtraction by the subtractor; a time-to-frequency converter configured to convert, into frequency domain signals, each of the signals in the plurality of time durations, which are extracted by the plurality of duration extractors; and a plurality of reconstructors configured to generate a plurality of replica signals of a desired signal based on the channel estimation value and the symbol replica, add the plurality of replica signals of the desired signal to the frequency domain signals generated by conversion by the time-to-frequency converter, and extract, in the plurality of time durations, each of subcarrier elements of the reception signal. The plurality of reconstructors is configured to extract subcarrier elements of the frequency domain signals generated by conversion by the time-to-frequency converter, and add to the subcarrier elements extracted, a desired stream element among the subcarrier elements of the plurality of replica signals of the desired signal.

(11) Additionally, regarding the reception device according to the present invention, the reception device is configured to receive, as the reception signal, a plurality of signals of a plurality of streams that are signal streams transmitted from each of the plurality of antennas included in a transmission device. The signal extractor includes: a filter unit configured to generate a reception signal replica that is a replica of the reception signal in a time domain, based on the channel estimation value and the symbol replica; a subtractor configured to subtract the reception signal replica from the reception signal; a plurality of duration extractors configured to extract signals in the plurality of time durations from a signal generated by subtraction by the subtractor; a time-to-frequency converter configured to convert, into frequency domain signals, each of the signals in the plurality of time durations, which are extracted by the plurality of duration extractors; and a plurality of reconstructors configured to generate a plurality of replica signals of a desired signal based on the channel estimation value and the symbol replica, add the plurality of replica signals of the desired signal to the frequency domain signals generated by conversion by the time-to-frequency converter, and extract, in the plurality of time durations, each of subcarrier elements of the reception signal, and the plurality of reconstructors is configured to extract subcarrier elements of the frequency domain signals generated by conversion by the time-to-frequency converter, and add to the subcarrier elements extracted, all desired stream elements among the subcarrier elements of the plurality of replica signals of the desired signal.

(12) Additionally, regarding the reception device according to the present invention, the demodulator is configured to demodulate a signal based on a minimum mean square error criteria.

(13) Further, the present invention is a reception method for a reception device configured to demodulate information from a reception signal. The reception method includes: a first step of a channel estimator estimating a channel estimation value; a second step of a symbol replica generator generating a symbol replica that is a modulation symbol of the information demodulated; a third step of a signal extractor extracting, in a plurality of time durations, each of subcarrier elements of the reception signal from which an interference is cancelled, based on the channel estimation and the symbol replica; and a fourth step of a demodulator demodulating signals on the subcarrier elements of the reception signal, based on signals in the plurality of time durations which are extracted by the signal extractor.

(14) Moreover, the present invention is a reception program causing a computer of a reception device configured to demodulate information from a reception signal, to function as a channel estimating means configured to estimate a channel estimation value; a symbol replica generating means configured to generate a symbol replica that is a modulation symbol of the information demodulated; a signal extracting means configured to extract, in a plurality of time durations, each of subcarrier elements of the reception signal from which an interference is cancelled, based on the channel estimation and the symbol replica; and a demodulating means configured to demodulate signals on the subcarrier elements of the reception signal, based on signals in the plurality of time durations which are extracted by the signal extractor.

Effects of the Invention

According to the present invention, it is possible to prevent an increase in the amount of calculation when the reception device for wireless communication detects information from a reception signal under environments in which a delayed path is present.

BEST MODE FOR CARRYING OUT THE INVENTION

First Embodiment

Hereinafter, a first embodiment of the present invention is explained in detail with reference to the drawings.

Figure 1:
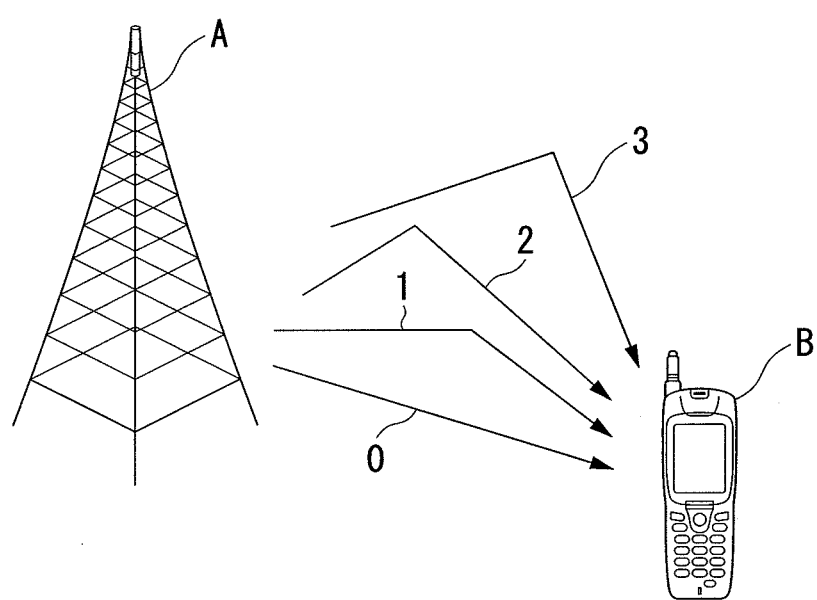
FIG. 1 is a conceptual diagram illustrating a communication system according to a first embodiment of the present invention.

FIG. 1 is a conceptual diagram illustrating a communication system according to a first embodiment of the present invention.

In FIG. 1, the communication system includes a transmission device A and a reception device B. FIG. 1 illustrates that a transmission signal transmitted from the transmission device A is received by the reception device B by way of D+1 (D=3 in the case of FIG. 1) channels (also referred to as paths) d (d=0, 1, 2, ..., D) due to reflection from buildings or the like. Here, d are the numbers appended in ascending order of the length of the channel with the shortest one first (the order of arrival time of the signal by way of the channel with the earliest one first) (d is referred to as the channel number). Here, a signal received by way of d=0, that is, the shortest path, is referred to as a preceding wave. Additionally, D denotes the maximum channel number. For example, when D=3, the number of channels is 4.

Hereinafter, in the first embodiment, the transmission device A is denoted as a transmission device a1, and the reception device B is denoted as a reception device b1.

(Configuration of Transmission Device a1)

Figure 2:
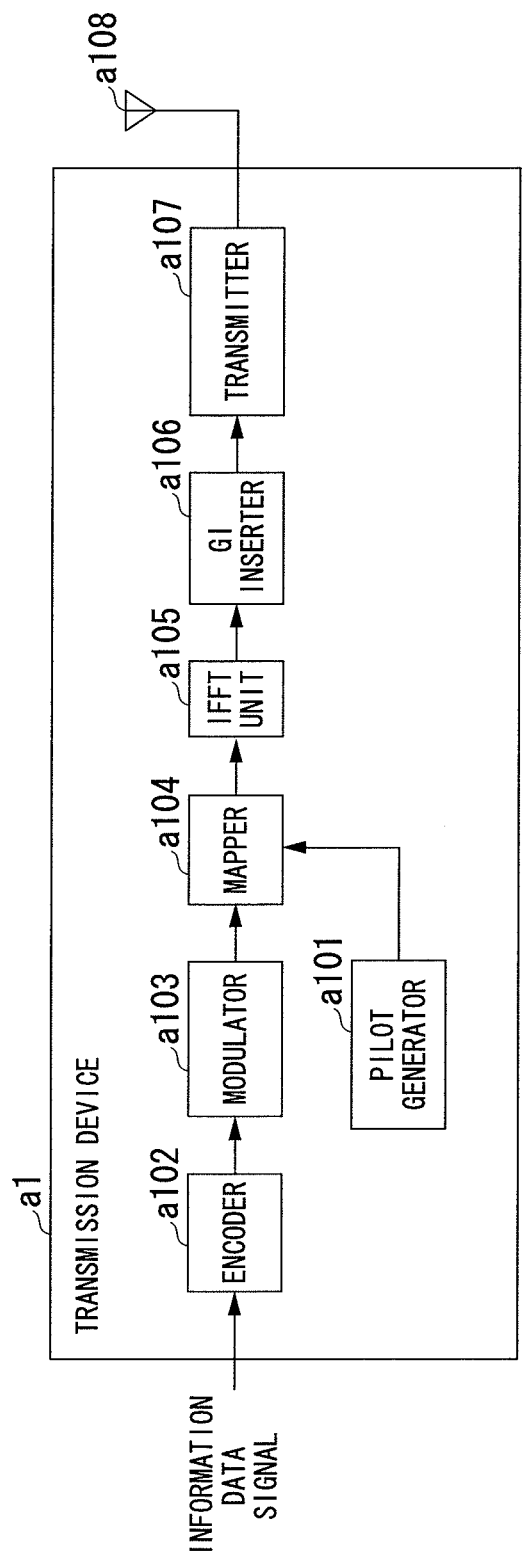
FIG. 2 is a schematic block diagram illustrating a configuration of a transmission device according to the first embodiment.

FIG. 2 is a schematic block diagram illustrating a configuration of a transmission device a1 according to the first embodiment. In FIG. 2, the transmission device a1 includes: a pilot generator a101; an encoder a102; a modulator a103; a mapper a104; an IFFT unit a105; a GI inserter a106; a transmitter a107; and a transmission antenna unit a108.

The pilot generator a101 generates a pilot signal having a waveform (or a signal stream), an amplitude value of which is previously stored by the reception device b1. Then, the pilot generator a101 outputs the generated pilot signal to the mapper a104.

The encoder a102 encodes information bits to be transmitted to the reception device b1, using an error correction code, such as a convolutional code, a turbo code, or an LDPC (Low Density Parity Check) code, and thereby generates encoded bits. The encoder a102 outputs the generated encoded bits to the modulator a103.

The modulator a103 modulates the encoded bits received from the encoder a102 using a modulation scheme, such as PSK (Phase Shift Keying) or QAM (Quadrature Amplitude Modulation), and thereby generates modulation symbols. The modulator a103 outputs the generated modulation symbols to the mapper a104.

The mapper a104 maps the pilot signal received from the pilot generator a101 and the modulation symbols received from the modulator a103 to resources (time-frequency bands) based on predetermined mapping information, and thereby generates frequency domain signals. Then, the mapper a104 outputs the generated frequency domain signals to the IFFT unit a105. Here, the resource denotes a unit to which modulation symbols are allocated, and the unit includes one subcarrier and one FFT duration, which will be explained later, in a frame to be transmitted by the transmission device a1. Additionally, the mapping information is determined by the transmission device a1, and is previously reported from the transmission device a1 to the reception device b1.

The IFFT unit a105 performs frequency-to-time conversion on the frequency domain signals received from the mapper a104, and thereby generates a time domain signal. Here, a time duration that is a unit for performing IFFT is referred to as an FFT duration. The IFFT unit a105 outputs the generated time domain signal to the GI inserter a106.

The GI inserter a106 adds, for each signal in the FFT duration, a guard interval to the time domain signal received from the IFFT unit a105. Here, the guard interval denotes a duplicate of part of a rear portion of the signal in the FFT duration, and the GI inserter a106 adds the duplicated signal to the front of the signal in the FFT duration.

Here, the FFT duration and the time duration of the guard interval added to the signal in that time duration (referred to as the GI duration) are collectively referred to as an OFDM symbol duration. Additionally, a signal in the OFDM symbol duration is referred to as an OFDM symbol. The GI inserter a106 outputs to the transmitter a107, the signal to which the guard interval is added.

The transmitter a107 performs digital-to-analog conversion on the signal received from the GI inserter a106, and performs waveform shaping on the analog signal generated by the conversion. The transmitter a107 upconverts the signal subjected to the waveform shaping, from a baseband signal to a radio frequency signal. Then, the transmitter a107 transmits the upconverted signal from the transmission antenna a108 to the reception device b1.

(Configuration of Reception Device b1)

Figure 3:
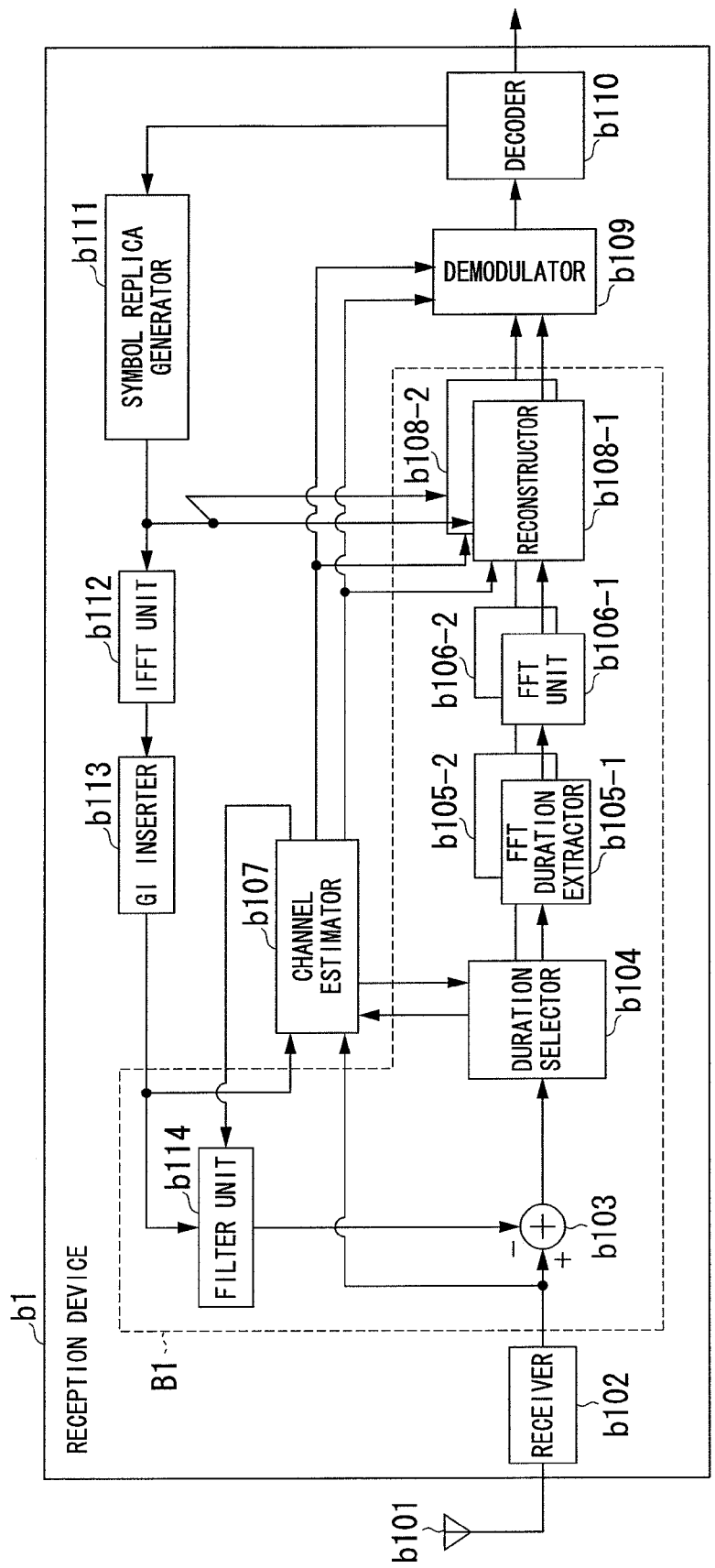
FIG. 3 is a schematic block diagram illustrating a configuration of a reception device according to the first embodiment.

FIG. 3 is a schematic block diagram illustrating a configuration of the reception device b1 according to the first embodiment. In FIG. 3, the reception device b1 includes: a reception antenna b101; a receiver b102; a subtractor b103; a duration selector b104; FFT duration extractors b105-1 and b105-2; FFT units b106-1 and b106-2; a channel estimator b107; reconstructors b108-1 and b108-2; a demodulator b109; a decoder b110; a symbol replica generator b111; an IFFT unit b112; a GI inserter b113; and a filter unit b114. Here, the subtractor b103, the duration selector b104, the FFT duration extractors b105-1 and b105-2, the FFT units b106-1 and b106-2, the reconstructors b108-1 and b108-2, and the filter unit a113 form a signal extractor B1.

The receiver b102 receives, through the reception antenna b101, the transmission signal transmitted by the transmission device a1. The receiver b102 performs frequency conversion and analog-to-digital conversion on the received signal. The receiver b102 stores the reception signal subjected to the conversions. The receiver b102 outputs the stored reception signal to the subtractor b103 and the channel estimator b107 in the initial process and in the timing in which a filter unit b114 that will be explained later inputs a replica of the reception signal to the subtractor b103.

The subtractor b103 subtracts from the reception signal received from the receiver b102, the replica of the reception signal received from the filter unit b114 that will be explained later. The subtractor b103 outputs to the duration selector b104, the signal from which the replica of the reception signal is subtracted.

Here, in the initial process, the subtractor b103 receives no input (zero) from the filter unit b114, and outputs to the duration selector b104, the reception signal received from the receiver b102 as it is.

The duration selector b104 determines whether or not there is a delayed path whose delay exceeds the GI, based on a channel impulse response received from the channel estimator b107 that will be explained later.

If there is no delayed path whose delay exceeds the GI, the duration selector b104 outputs selected duration information indicating an FFT duration of the preceding wave, to the channel estimator b107, the FFT duration extractors b105-1 and b105-2, and the symbol replica generator b111. Additionally, in this case, the duration selector b104 outputs to the FFT duration extractor b105-1, the signal received from the subtractor b103. Here, in this case, the process performed by each unit of the reception device b1 is referred to as a "within-GI delay process." Further, in the initial process, the duration selector b104 outputs to the FFT duration extractor b105-1, the signal received from the subtractor b103.

Figure 5:
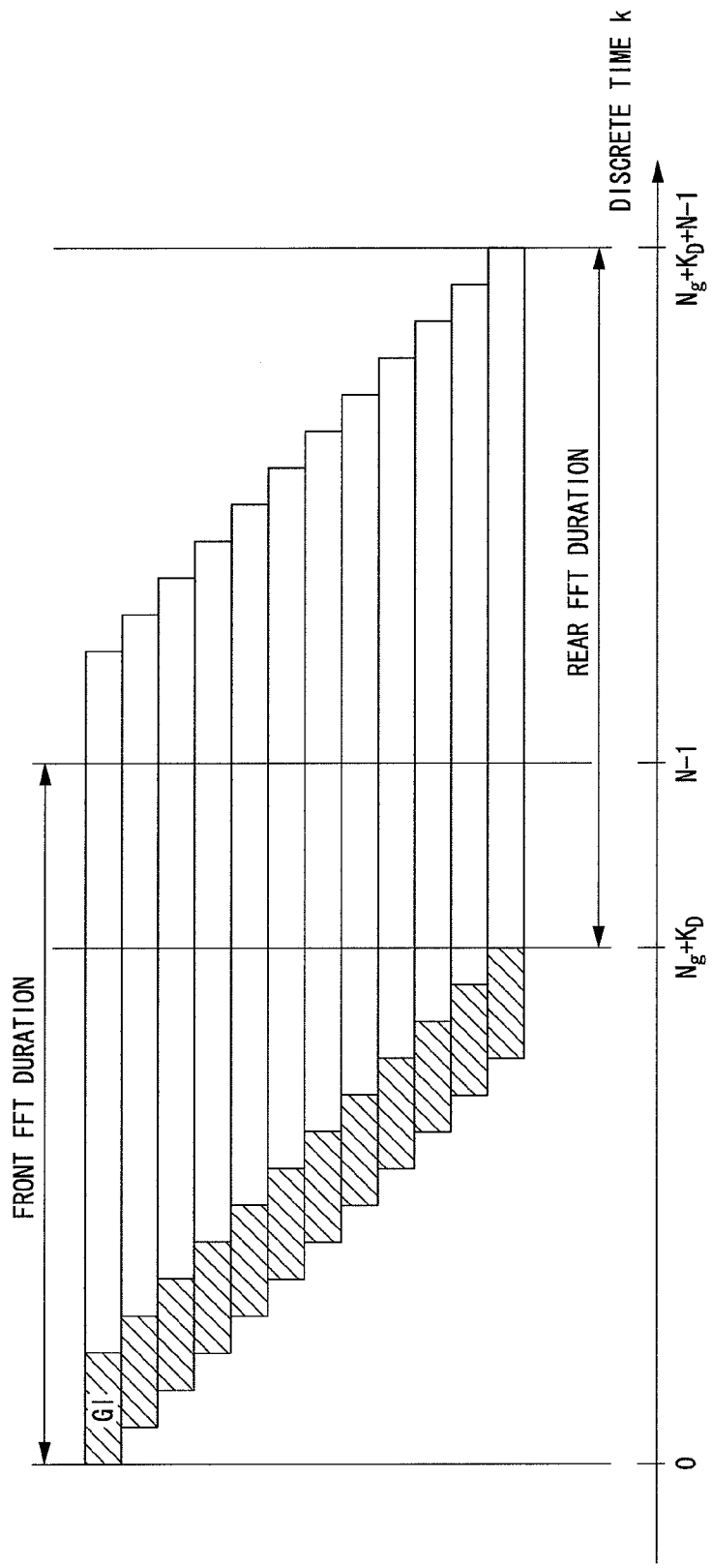
FIG. 5 is a schematic diagram illustrating an example of FFT durations to be selected by the reception device according to the first embodiment.

If there is a delayed path whose delay exceeds the GI, on the other hand, the duration selector b104 selects a duration having the length of the FFT duration measured from the front of the preceding wave (referred to as a front FFT duration; see FIG. 5), and an FFT duration of a signal received by way of the path d=D, that is, the maximum delayed path (referred to as a rear FFT duration) (see FIG. 5 for each FFT duration). The duration selector b104 outputs selected duration information indicating the selected FFT durations, to the channel estimator b107, the FFT duration extractors b105-1 and b105-2, and the symbol replica generator b111. Here, the duration selector b104 outputs to the FFT duration extractor b105-1, the selected duration information indicating the front FFT duration. Further, the duration selector b104 outputs to the FFT duration extractor b105-2, the selected duration information indicating the rear FFT duration.

Additionally, in this case, the duration selector b104 outputs the signal received from the subtractor b103, to the FFT duration extractors b105-1 and b105-2. Further, in this case, the process performed by each unit of the reception device b1 is referred to as an "over-GI delay process."

The FFT duration extractor b105-1 extracts from the signal received from the duration selector b104, a signal in the FFT duration indicated by the selected duration information (the FFT duration of the preceding wave, or the front FFT duration). The FFT duration extractor b105-1 outputs the extracted signal to the FFT unit b106-1. Here, in the initial process, the FFT duration extractor b106-1 extracts a signal in the FFT duration of the preceding wave.

The FFT duration extractor b105-2 extracts from the signal received from the duration selector b104, a signal in the FFT duration indicated by the selected duration information (the rear FFT duration). The FFT duration extractor b105-2 outputs the extracted signal to the FFT unit b106-2. Here, in the case of the within-GI delay process, the FFT duration extractor b105-2 receives neither a signal nor selected duration information, and does not perform any process.

The FFT units b106-1 and b106-2 perform time-to-frequency conversion on the time domain signals received from the FFT duration extractors b105-1 and b105-2, respectively. Then, the FFT units b106-1 and b106-2 output the frequency domain signals generated by the conversion, to the reconstructors b108-1 and the b108-2, respectively.

The channel estimator b107 estimates a channel impulse response in an OFDM symbol duration, based on the reception signal received from the receiver b102, and a replica signal of a transmission signal received from the GI inserter b113 which will be explained later. Here, an RLS (Recursive Least Square) algorism, or another algorithm, such as an LMS (Least Mean Square) algorithm, may be used for estimating the channel impulse response. In the case of the initial process, the channel estimator b107 receives no input (zero) from the GI inserter b113, and estimates a channel impulse response varying with time in the OFDM symbol duration, based on the pilot signal previously stored and the reception signal received from the receiver b102.

The channel estimator b107 outputs the estimated channel impulse response to the filter unit b114 and the duration selector b104. Additionally, the channel estimator b107 performs time-to-frequency conversion on the estimated channel impulse. The channel estimator b107 outputs to the reconstructors b108-1 and b108-2 and the demodulator b109, a frequency response for each FFT duration indicated by the selected duration information received from the selection selector b104, the frequency response being a frequency domain signal generated by the conversion.

Specifically, in the within-GI delay process, the channel estimator b107 outputs to the reconstructor b108-1, a frequency response in the FFT duration of the preceding wave. Additionally, in the over-GI delay process, the channel estimator b107 outputs to the reconstructor b108-1, a frequency response in the front FFT duration, and outputs to the reconstructor b108-2, a frequency response in the rear FFT duration.

Further, the channel estimator b107 generates a replica of the pilot signal using the estimated frequency response and the previously-stored pilot signal. The channel estimator b107 calculates the noise power based on the pilot signal in the reception signal and the generated replica of the pilot signal. Moreover, the channel estimator b107 calculates the power of ICI (referred to as the ICI power), based on the estimated frequency response and the pilot signal. The details of the processes for the channel estimator b107 to calculate the noise power and the ICI power are explained later together with an operation principle. The channel estimator b107 outputs to the demodulator b109, the noise power and the ICI power which are calculated.

Each of the reconstructors b108-1 and b108-2 multiplies, for each subcarrier, the symbol replica received from the symbol replica generator b111 that will be explained later, by the frequency response received from the channel estimator b107, thereby generating a replica signal of the desired signal affected by the channel. Each of the reconstructors b108-1 and b108-2 adds, for each subcarrier, the generated replica signal to the associated one of the signals received from the FFT units b106-1 and b106-2. In other words, the reconstructors b108-1 and b108-2 generate replica signals of the desired signal based on the channel estimation values and the symbol replicas, add these replica signals of the desired signal to the frequency domain signals generated by the conversion performed by the FFT units b106-1 and b106-2, and thereby extract the respective subcarrier elements of the reception signal.

The reconstructors b108-1 and b108-2 output to the demodulator b109, the signals to which the replica signals are added.

In the case of the initial process, the reconstructors b108-1 and b108-2 receive no input (zero) from the symbol replica generator b111, and output to the demodulator b109, the signals respectively received from the FFT units b106-1 and b106-2 as they are.

As explained above, the signal extractor B1 cancels a replica of the reception signal from the reception signal, based on the channel estimation value and the symbol replica, and thereby reconstructs the desired signal, thereby extracting each of the subcarrier elements of the reception signal from which the ISI and the ICI (interferences) are cancelled.

Using the frequency response, the noise power, and the ICI power which are received from the channel estimator b107, the demodulator b109 calculates a filter coefficient based on a ZF (Zero Forcing) criterion, an MMSE (Minimum Mean Square Error) criterion, or the like. Using the calculated filter coefficient, the demodulator b109 performs compensation (channel compensation) of variations in amplitude and phase of the signal. The demodulator b109 demaps the signal subjected to the channel compensation, based on mapping information previously reported from the transmission device a1, and performs a demodulation process on the demapped signal. The demodulator b109 outputs to the decoder b110, the bit log likelihood ratios (LLR) that are the results of the demodulation process.

The decoder b110 performs a decoding process on the demodulation symbols received from the demodulator b109, using MLD (Maximum Likelihood Decoding), MAP (Maximum A posteriori Probability), log-MAP, Max-log-MAP, SOVA (Soft Output Viterbi Algorithm), or the like.

If it is determined at a result of the decoding process that there are no detected errors or that the process has been performed the predetermined number of times, the decoder [[b09]]b109 outputs the results of the decoding, i.e., the bit log likelihood ratios, as information data bits. If it is determined that an error is detected and that the process has not yet been performed the predetermined number of times, on the other hand, the decoder b110 outputs to the symbol replica generator b111, the results of the decoding, i.e., the bit log likelihood ratios.

The symbol replica generator b111 calculates expectation values of the bit log likelihood ratios received from the decoder b110, modulates the calculated expectation values, and thereby generates modulation symbols (symbol replicas). The symbol replica generator b111 maps the generated symbol replicas based on the mapping information previously reported from the transmission device a1. The symbol replica generator b111 outputs the mapped symbol replicas to the reconstructors b108-1 and b108-2, and the IFFT unit b112.

The IFFT unit b112 performs frequency-to-time conversion on the symbol replicas received from the symbol replica generator b111, and outputs to the GI inserter b113, a time domain replica signal generated by the conversion.

The GI inserter b113 adds, for each signal in the FFT duration, a guard interval to the replica signal received from the IFFT unit b112, and thereby generates a replica of the transmission signal. The GI inserter b113 outputs the generated replica of the transmission signal to the channel estimator b107 and the filter unit b114.

The filter unit b114 generates a replica of the reception signal, based on the channel impulse response received from the channel estimator b107 and the replica of the transmission signal received from the GI inserter b113. The filter unit b114 outputs the generated replica of the reception signal to the subtractor b103.

The reception device b1 repeatedly performs, on the same signal, the process from the subtractor b103 to the filter unit b114 until the decoder b110 detects no errors or the process has been repeatedly performed the predetermined number of times (referred to as an iteration process).

Figure 4:
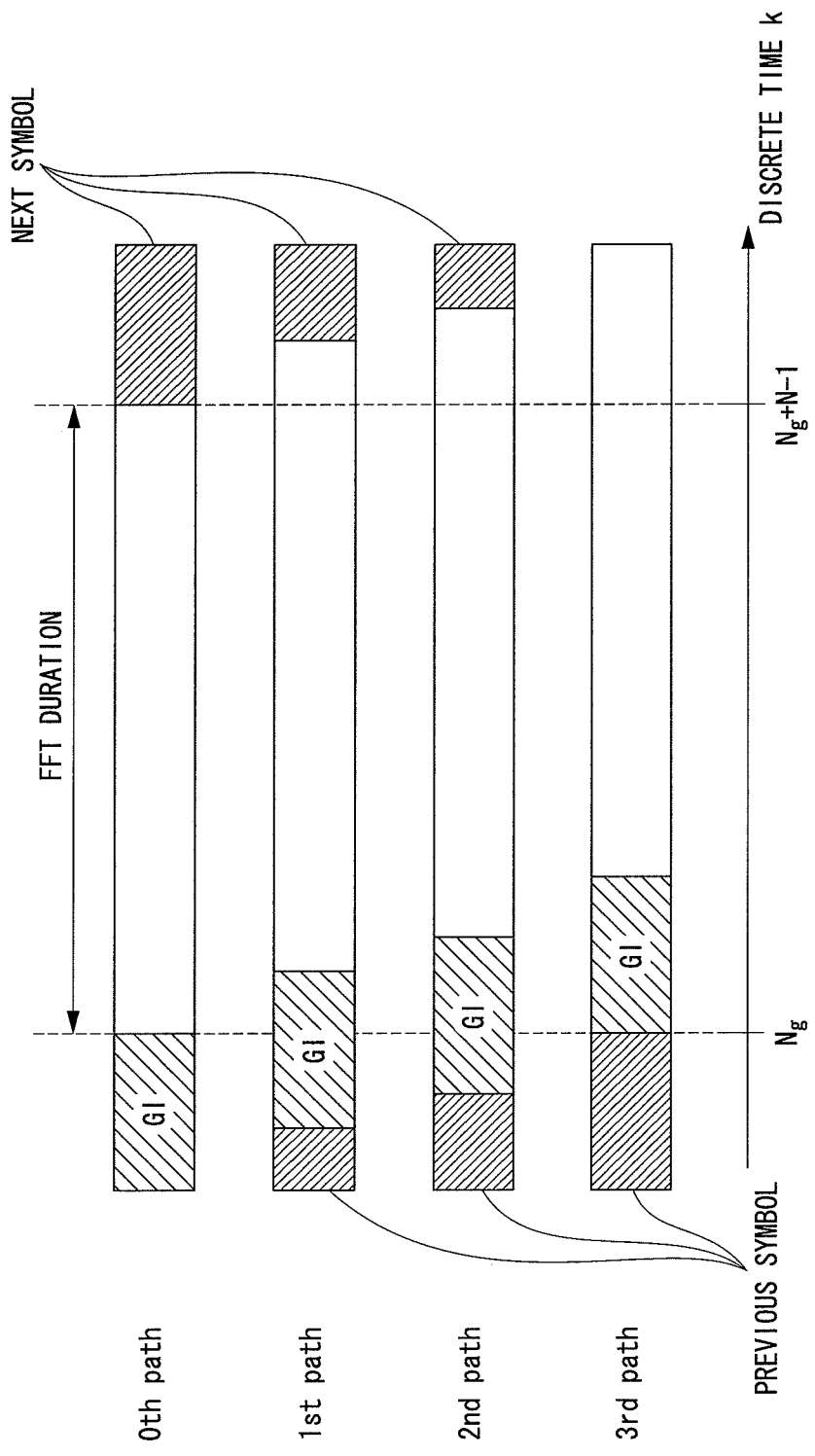
FIG. 4 is a schematic diagram illustrating an example of reception signals according to the first embodiment.

FIG. 4 is a schematic diagram illustrating an example of the reception signals according to the first embodiment. FIG. 4 illustrates a case in which the maximum delay does not exceed the length of the GI, and there is no interference due to the preceding OFDM symbol. In this case, the duration selector b104 determines that there is no delay path whose delay exceeds the GI, and each unit of the reception device b1 performs the within-GI delay process.

In FIG. 4, reception signals received by way of channels allocated with the channel numbers 1, 2, 3, and 4 shown in FIG. 1 are denoted as the 0-th path (path of the preceding wave), the 1st path, the 2nd path, and the 3rd path (maximum delay path), which are illustrated sequentially in this order from the top.

In FIG. 4, the horizontal axis denotes a time axis, which indicates a discrete time sectioned at a predetermined time interval. In FIG. 4, regions hatched by diagonal lines rising from bottom left to top right denote the GIs (Guard Intervals). Additionally, regions hatched by diagonal lines falling from top left to bottom right denote the previous and next OFDM symbols.

Further, N denotes the number of points in the FFT (Fast Fourier Transform) duration (which is also the number of points in the IFFT (Inverse Fast Fourier Transform) duration). Moreover, $N_g$ denotes the number of points of the GI. Here, the number of points denotes the number of discrete times.

FIG. 5 is a schematic diagram illustrating an example of the FFT durations selected by the reception device b1 according to the first embodiment. FIG. 5 illustrates a case in which the maximum delay exceeds the length of the GI, and there is an interference due to the previous OFDM symbol. In this case, the duration selector b104 determines that there is a delay path whose delay exceeds the GI, and each unit of the reception device b1 performs the over-GI delay process.

In FIG. 5, there are twelve paths (including the path of the preceding wave). Additionally, FIG. 5 shows that the discrete time from 0 to N−1 is the front FFT duration, and that the discrete time from $N_g+K_D$ to $N_g+K_D+N-1$ is the rear FFT duration. In other words, the duration selector b104 selects two FFT durations from which signals are to be extracted, such that the start point of one of the FFT durations corresponds to the head of the preceding wave, and the end point of the other one of the FFT durations corresponds to the end of the maximum delay path.

(Regarding Operation Principle)

Hereinafter, the operation principles for the reception device b1 are explained with reference to FIG. 3. Firstly, the operation principle of the initial process is explained here.

(Regarding Initial Process)

If the maximum delay does not exceed the GI, the reception signal $r_{k,i}$ of the i-th symbol at the discrete time k, which is received by the receiver b102 can be expressed by the following formulas (1) and (2).

[Formula 1]

$$r_{k,i} = \sum_{d=0}^{D} h_{i,d,k} s_{i,k-d} + z_{i,k} \quad (1)$$

$$s_{i,k} = \frac{1}{\sqrt{N}} \sum_{n=0}^{N-1} S_{i,n} \exp\left[j\frac{2\pi n}{N}(k-N_g)\right] \quad (2)$$

Here, D denotes the maximum channel number. $h_{i,d,k}$ denotes a complex amplitude of the path allocated with the channel number d (referred to as the d-th path) of the i-th symbol at the discrete time k. $s_{i,k}$ denotes a time-domain transmission signal of the i-th symbol. $z_{i,k}$ denotes a time-domain noise of the i-th symbol. Additionally, N denotes the number of points in the FFT duration. $S_{i,n}$ denotes a modulation signal of the i-th symbol on the n-th subcarrier. $N_g$ denotes the number of points in the GI duration (see FIG. 4). j denotes an imaginary unit.

The signal $R_{i,n}$, which is generated by the FFT unit b106-1 performing the time-to-frequency conversion on the reception signal $r_{i,k}$ in the FFT duration, can be expressed by the following formulas (3) and (4).

[Formula 2]

$$R_{i,n} = \frac{1}{\sqrt{N}} \sum_{n=N_g}^{N_g+N-1} r_{i,k} \exp\left[-j\frac{2\pi n}{N}(k-N_g)\right] \quad (3)$$

$$= W_{i,n,n} S_{i,n} + \sum_{m=0, m\neq n}^{N-1} W_{i,n,m} S_{i,m} + Z_{i,n}$$

$$W_{i,n,m} = \frac{1}{N}\sum_{d=0}^{D}\sum_{k=N_g}^{N_g+N-1} h_{i,d,k} \exp\left[-j\frac{2\pi(n-m)}{N}(k-N_g)\right]\exp\left(-j\frac{2\pi n}{N}d\right) \quad (4)$$

Here, $W_{i,n,m}$ denotes a leaking coefficient of a signal leaking from the m-th subcarrier into the n-th subcarrier. Additionally, $Z_{i,n}$ denotes a noise of the n-th subcarrier. Additionally, $W_{i,n,n}$ in the case of m=n in the formula (4) denotes a frequency response of the n-th subcarrier, and can be expressed by the following formula (5).

[Formula 3]

$$W_{i,n,n} = \sum_{d=0}^{D}\left(\frac{1}{N}\sum_{k=N_g}^{N_g+N-1} h_{i,d,k}\right)\exp\left(-j\frac{2\pi n}{N}d\right) \quad (5)$$

Here, the formula (5) corresponds to the result of discrete Fourier transform with respect to a time average of the channel impulse response varying with time in the OFDM symbol. In the initial process, the channel estimator b107 directly estimates $W_{i,n,n}$ using the pilot signal. In the initial process, the signal expressed by the formula (3) is output as it is to the demodulator b109 via units from the FFT units b106-1 and b106-2 to the reconstructors b108-1 and b108-2. For example, when a filtering with the MMSE criterion is used, the demodulator b109 calculates the demodulation symbol $S'_{i,n}$ using the following formula (6).

[Formula 4]

$$S'_{i,n} = \frac{W^*_{i,n,n}}{W^*_{i,n,n} W_{i,n,n} + \sigma_z^2 + \sigma_I^2} R_n \quad (6)$$

Here, Y* denotes a complex conjugate of Y. The initial process is the reception process performed without ICI being cancelled, which affects and causes the transmission performance to deteriorate. Additionally, in the formula (6), $\sigma_z^2$ denotes the noise power, and $\sigma_I^2$ denotes the ICI power. The channel estimator b107 calculates those powers using the following formulas (7) and (8).

[Formula 5]

$$\sigma_z^2 = E[|Z_{i,n}|^2] \quad (7)$$

[Formula 6]

$$\sigma_I^2 = E\left[\left|\sum_{m=0,m\neq n}^{N-1} W_{i,n,m} S_{i,m}\right|^2\right] \quad (8)$$

Here, E[X] denotes an ensemble average of X. In the first embodiment, the channel estimator b107 calculates the noise power $\sigma_z^2$ and the ICI power $\sigma_I^2$ using the pilot signal, the results of which are substituted in the formula (6) to calculate the demodulation symbol $S'_{i,n}$.

The demodulator b109 calculates bit log likelihood ratios from the demodulation symbols $S'_{i,n}$ in the formula (6). Equalized amplitude gain is used for that calculation process. Specifically, in the case of QPSK, with respect to the equalized amplitude gain $\mu_{i,n}$ of the n-th subcarrier expressed by the following formula (9), the bit log likelihood ratios λ can be expressed by the following formulas (10) and (11). Here, the following formulas (10) and (11) are the bit log likelihood ratios $\lambda(b_{i,n,0})$ and $\lambda(b_{i,n,1})$ of the first bit $b_{i,n,0}$ and the second bit $b_{i,n,1}$, respectively.

[Formula 7]

$$\mu_{i,n} = \frac{W_{i,n,n}^* W_{i,n,n}}{W_{i,n,n}^* W_{i,n,n} + \sigma_z^2 + \sigma_I^2} \quad (9)$$

[Formula 8]

$$\lambda(b_{i,n,0}) = \frac{4\mathrm{Re}\lfloor S'_{i,n} \rfloor}{\sqrt{2}(1-\mu_{i,n})} \quad (10)$$

[Formula 9]

$$\lambda(b_{i,n,1}) = \frac{4\mathrm{Im}\lfloor S'_{i,n} \rfloor}{\sqrt{2}(1-\mu_{i,n})} \quad (11)$$

Hereinafter, an operation principle of the iteration process in the case of the within-GI delay process and an operation principle of the iteration process in the case of the over-GI delay process are separately explained.

[Regarding Iteration Process (within-Gi Delay Process)]

Firstly, the case of the within-GI delay process is explained.

The symbol replica generator b111 calculates expectation values of the bit log likelihood ratios decoded by the decoder b110, modulates the calculated expectation values, and thereby generates symbol replicas S". The symbol replica $S''_{i,n}$ is subjected to the frequency-to-time conversion by the IFFT unit b112, and then is subjected to the insertion of GI by the GI inserter b113. The replica $s''_{i,k}$ of the transmission signal output from the GI inserter b113 can be expressed by the following formula (12).

[Formula 10]

$$s''_{i,k} = \frac{1}{\sqrt{N}} \sum_{n=0}^{N-1} S''_{i,n} \exp\left[j\frac{2\pi n}{N}(k-N_g)\right] \quad (12)$$

Here, the IFFT unit b112 performs inverse fast Fourier transform to generate the replica $s''_{i,k}$ of the transmission signal shown in the formula (12). The order of the number of multiplication in this conversion is $O(N \log_2 N)$.

The channel estimator b107 estimates the channel impulse response $h_{i,d,k}$ based on the replica of the transmission signal expressed by the formula (12) and the reception signal received from the receiver b102. Additionally, the channel estimator b107 calculates the time average of the channel impulse response $h_{i,d,k}$, performs time-to-frequency conversion, and thereby calculates the frequency response $W_{i,n,n'}$.

Based on the channel impulse response $h_{i,d,k}$ and the replica $s''_{i,k}$ of the transmission signal expressed by the formula (12), the filter unit b114 generates a replica $r''_{i,k}$ of the reception signal expressed by the following formula (13).

[Formula 11]

$$r''_{i,k} = \sum_{d=0}^{D} h_{i,d,k} s''_{i,k-d} \quad (13)$$

Here, in order to generate the replica of the received signal shown in the formula (13), the order of the number of multiplication in the process by the filter unit b114 is O(DN). Since it is general that D<<N, the order can be considered to be O(N).

The subtractor b103 subtracts the replica $r''_{i,k}$ of the reception signal expressed by the formula (13) from the reception signal $r_{i,k}$ expressed by the formula (1), and thereby outputs the signal $r'_{i,k}$ expressed by the following formula (14).

[Formula 12]

$$r'_{i,k} = r_{i,k} - r''_{i,k} \quad (14)$$

$$= \sum_{d=0}^{D} h_{i,d,k}(s_{i,k-d} - s''_{i,k-d}) + z_{i,k}$$

The FFT duration extractor b105-1 extracts a signal in the FFT duration of the preceding wave from the signal $r'_{i,k}$ in the FFT duration. The FFT unit b106-1 performs time-to-frequency conversion on the extracted signal. The signal $R'_{i,n}$ output from the FFT unit b106-1 can be expressed by the following formula (15).

[Formula 13]

$$R'_{i,n} = \frac{1}{\sqrt{N}} \sum_{n=N_g}^{N_g+N-1} r'_{i,k} \exp\left[-j\frac{2\pi n}{N}(k-N_g)\right] \quad (15)$$

$$= W_{i,n,n}(S_{i,n} - S''_{i,n}) + \sum_{m=0, m\neq n}^{N-1} W_{i,n,m}(S_{i,m} - S''_{i,m}) + Z_{i,n}$$

Here, the FFT unit b106-1 performs fast Fourier transform to generate the signal $R'_{i,n}$ shown in the formula (15). The order of the number of multiplication in that conversion is $O(N \log_2 N)$.

The reconstructor b108-1 multiplies the symbol replica $S''_{i,n}$ by the frequency response $W_{i,n,n}$, and thereby generates the replica signal $W_{i,n,n}S''_{i,n}$ of the desired signal affected by the channel. The reconstructor b108-1 adds the generated replica signal $W_{i,n,n}S''_{i,n}$ to the signal expressed by the formula (15). The signal $Y_{i,n}$ generated by the addition can be expressed by the following formula (16).

[Formula 14]

$$Y_{i,n} = R'_{i,n} + W_{i,n,n}S''_{i,n} \quad (16)$$

$$= W_{i,n,n}S_{i,n} + \sum_{m=0, m\neq n}^{N-1} W_{i,n,m}(S_{i,m} - S''_{i,m}) + Z_{i,n}$$

This formula (16) indicates that the desired signal on the n-th subcarrier remains, which is the signal from which the ICI is cancelled. The ICI is cancelled, thereby improving the signal to interference noise power ratio (SINR), and therefore improving the transmission performance.

Additionally, the reconstructor b108-1 performs, for each subcarrier, the process to generate the signal $Y_{i,n}$ expressed by the formula (16). For this reason, the order of the number of multiplication in that process is O(N). For example, when a filtering with the MMSE criterion is used, the demodulator b109 calculates, from the signal $Y_{i,n}$ expressed by the formula (16), the demodulation symbol $S'_{i,n}$ of the n-th subcarrier expressed by the following formula (17), and thereby performs demodulation.

[Formula 15]

$$S'_{i,n} = \frac{E[|S_{i,n}|^2]W^*_{i,n,n}}{E[|S_{i,n}|^2]W^*_{i,n,n}W_{i,n,n} + \sum_{m=0,m\neq n}^{N-1}(E[|S_{i,m}|^2] - |S''_{i,m}|^2)W^*_{i,n,m}W_{i,n,m} + \sigma_Z^2} Y_{i,n} \quad (17)$$

In the first embodiment, the demodulator b109 calculates the demodulation symbol $S'_{i,n}$ using the following approximate formula (19) that will be explained later.

The decoder b110 performs the decoding process on the bit log likelihood ratios $\lambda(b_{i,n,0})$ and $\lambda(b_{i,n,1})$ of the demodulation symbol $S'_{i,n}$ expressed by the formula (17).

Here, regarding the frequency response $W_{i,n,n}$ expressed by the formula (5), the center value of symbols in the varying channel impulse response, in lieu of the channel impulse response in the formula (5). In this case, the frequency response $W_{i,n,n}$ used in lieu of the formula (5) can be expressed by the following formula (18).

[Formula 16]

$$W_{i,n,n} = \sum_{d=0}^{D} h_{i,d,N_g+N/2}\exp\left(-j\frac{2\pi n}{N}d\right) \quad (18)$$

Thereby, the process of calculating the frequency response $W_{i,n,n}$ can be reduced.

Additionally, the formula (17) is a formula in precise consideration of the cancellation residual after the cancellation using the replicas of the reception signal, and also in consideration of the fact that preliminary information can be obtained by the decoding process and the fact that the powers of the modulation symbols on each subcarrier cannot be normalized to 1. On the other hand, the cancellation residual may be subjected to noise approximation so that the powers of the demodulation symbols are normalized to 1. In this case, the demodulator b109 calculates the demodulation symbol $S'_{i,n}$ using the following formula (19).

[Formula 17]

$$S'_{i,n} = \frac{W^*_{i,n,n}}{W^*_{i,n,n}W_{i,n,n} + \sigma_Z^2 + \sigma_{I'}^2} Y_{i,n} \quad (19)$$

Here, $\sigma_{I'}^2$ denotes the power of the ICI cancellation residual (an ensemble average of the signal $R'_{i,n}$ with respect to subcarrier). Such calculation does not cause a deterioration of the performance. The formula (17) requires the number of multiplication with the order $O(N^2)$ to calculate the term of the ICI cancellation residual that is the second term of the denominator. If the formula (19) is used, however, the number of multiplication with the order $O(N)$ suffices to perform the process, thereby greatly reducing the number of multiplication. Consequently, the order of the maximum number of multiplication for each unit to perform the iteration process is $O(N \log_2 N)$. Thus, the reception device b1 can perform the iteration process by repeating the process for which the order of the number of multiplication is $O(N \log_2 N)$.

[Regarding Iteration Process (Over-GI Delay Process)]

Hereinafter, the case of the over-GI delay process is explained.

The FFT duration extractor b105-1 extracts a signal in the front FFT duration from the signal $r'_{i,k}$ in the FFT duration. The FFT unit b106-1 performs time-to-frequency conversion on the extracted signal. The signal $R'_{i,n,1}$ (the suffix "1" indicates the front FFT duration) output from the FFT unit b106-1 can be expressed by the formula (20).

[Formula 18]

$$\begin{aligned}R'_{i,n,1} &= \frac{1}{\sqrt{N}}\sum_{k=0}^{N-1} r'_{i,k}\exp\left(-j\frac{2\pi n}{N}k\right) \\ &= W_{i,n,n,1}(S_{i,n} - S''_{i,n}) + \\ &\quad \sum_{m=0,m\neq n}^{N-1} W_{i,n,m,1}(S_{i,m} - S''_{i,m}) + \\ &\quad \sum_{m=0}^{N-1} V_{i,n,m,1}(S_{i-1,m} - S''_{i-1,m}) + Z_{i,n,1}\end{aligned} \quad (20)$$

Here, $Z_{i,n,1}$ denotes noise in the front FFT duration which has been subjected to time-to-frequency conversion. Additionally, $V_{i,n,m,1}$ is a coefficient of ISI caused by the previous and next symbols in the front FFT duration, and indicates the leaking coefficient of leaking from the m-th subcarrier into the n-th subcarrier. Further, $W_{i,n,n,1}$ denotes a frequency response in the front FFT duration, which can be expressed by the following formula (21). Here, $W_{i,n,m,1}$ denotes a leaking coefficient of leaking from the m-th subcarrier into the n-th subcarrier with respect to the front FFT duration.

[Formula 19]

$$W_{i,n,n,1} = \sum_{d=0}^{D}\left(\frac{1}{N}\sum_{k=d}^{N-1} h_{i,d,k}\right)\exp\left[-j\frac{2\pi n}{N}(d+N_g)\right] \quad (21)$$

Additionally, the FFT duration extractor b105-2 extracts a signal in the rear FFT duration from the signal $r'_{i,k}$ in the FFT duration. The FFT unit b106-2 performs time-to-frequency conversion on the extracted signal. The signal $R'_{i,n,2}$ (the suffix "2" indicates the rear FFT duration) output from the FFT unit b106-2 can be expressed by the following formula (22).

[Formula 20]

$$\begin{aligned}R'_{i,n,2} &= \frac{1}{\sqrt{N}}\sum_{k=N_g+D}^{N_g+N+D-1} r'_{i,k}\exp\left(-j\frac{2\pi n}{N}(k - N_g - D)\right) \\ &= W_{i,n,n,2}(S_{i,n} - S''_{i,n}) + \\ &\quad \sum_{m=0,m\neq n}^{N-1} W_{i,n,m,2}(S_{i,m} - S''_{i,m}) + \\ &\quad \sum_{m=0}^{N-1} V_{i,n,m,2}(S_{i-1,m} - S''_{i-1,m}) + Z_{i,n,2}\end{aligned} \quad (22)$$

Here, $Z_{i,n,2}$ denotes noise in the rear FFT duration which has been subjected to time-to-frequency conversion. Additionally, $V_{i,n,m,2}$ is a coefficient of ISI caused by the previous and next symbols in the rear FFT duration, which indicates the leaking coefficient of leaking from the m-th subcarrier into the n-th subcarrier. Further, $W_{i,n,n,2}$ denotes a frequency response in the rear FFT duration, which can be expressed by the following formula (23) with use of a variable $a_d$ in the formula (22). Here, $W_{i,n,m,2}$ denotes a leaking coefficient of leaking from the m-th subcarrier into the n-th subcarrier with respect to the rear FFT duration.

[Formula 21]

$$W_{i,n,n,2} = \sum_{d=0}^{D} \left( \frac{1}{N} \sum_{k=N_g+D}^{N_g+N+d-1} h_{i,d,k} \right) \exp\left[-j\frac{2\pi n}{N}(d-D)\right] \quad (23)$$

The reconstructors b108-1 and b108-2 multiply the symbol replica $S''_{i,n}$ by the frequency responses $W_{i,n,n,1}$ and $W_{i,n,n,2}$ to generate the replica signals $W_{i,n,n,1}S''_{i,n}$ and $W_{i,n,n,2}S''_{i,n}$ the desired signals affected by the channel, respectively. The reconstructors b108-1 and b108-2 add the generated replica signals $W_{i,n,n,1}S''_{i,n}$ and $W_{i,n,n,2}S''_{i,n}$ to the signal $R'_{i,n,1}$ expressed by the formula (20) and $R'_{i,n,2}$ expressed by the formula (22), respectively. The signals $Y_{i,n,1}$ and $Y_{i,n,2}$ generated by the addition can be expressed by the following formulas (24) and (25).

[Formula 22]

$$Y_{i,n,1} = R'_{i,n,1} + W_{i,n,n,1}S''_{i,n} \quad (24)$$

$$= W_{i,n,n,1}S_{i,n} + \sum_{m=0,m\neq n}^{N-1} W_{i,n,m,1}(S_{i,m} - S''_{i,m}) +$$

$$\sum_{m=0}^{N-1} V_{i,n,m,1}(S_{i-1,m} - S''_{i-1,m}) + Z_{i,n,1}$$

$$Y_{i,n,2} = R'_{i,n,2} + W_{i,n,n,2}S''_{i,n} \quad (25)$$

$$= W_{i,n,n,2}S_{i,n} + \sum_{m=0,m\neq n}^{N-1} W_{i,n,m,2}(S_{i,m} - S''_{i,m}) +$$

$$\sum_{m=0}^{N-1} V_{i,n,m,2}(S_{i+1,m} - S''_{i+1,m}) + Z_{i,n,2}$$

These formulas (24) and (25) indicate that the desired signal on the n-th subcarrier remains, which is the signal from which the ICI and ISI are cancelled. The ISI and ICI have been cancelled, thereby improving the signal to interference noise power ratio (SINR), and therefore improving the transmission performance.

For example, when a filtering with the MMSE criterion is used, the demodulator b109 calculates the demodulation symbol $S'_{i,n}$ of the i-th symbol on the n-th subcarrier expressed by the following formula (26), from the signals $Y_{i,n,1}$ and $Y_{i,n,2}$ expressed by the formulas (24) and (25), and thereby performs demodulation.

[Formula 23]

$$S'_{i,n} = E[S_{i,n}^* Y_{i,n}^H] E[Y_{i,n} Y_{i,n}^H]^{-1} Y_{i,n} \quad (26)$$

Here, the bold fonts denote a vector and a matrix. $^H$ denotes a complex conjugate transpose. Here, the vector $V_{i,n}$ shown in the formula (26) can be expressed by the following formula (27), and multipliers thereof can be expressed by the following formulas (28) and (29).

[Formula 24]

$$Y_{i,n} = (Y_{i,n,1} \quad Y_{i,n,2})^T \quad (27)$$

$$= W_{i,n,n}S_{i,n} + \sum_{m=0,m\neq n}^{N-1} W_{i,n,m}(S_{i,m} - S''_{i,m}) +$$

$$\sum_{m=0}^{N-1} V_{i,n,m,1}(S_{i-1,m} - S''_{i-1,m}) +$$

$$\sum_{m=0}^{N-1} V_{i,n,m,2}(S_{i+1,m} - S''_{i+1,m}) + Z_{i,n} \text{ where,}$$

$$W_{i,n,m} = (W_{i,n,m,1} \quad W_{i,n,m,2})^T$$

$$V_{i,n,m,1} = (V_{i,n,m,1} \quad 0)^T$$

$$V_{i,n,m,2} = (0 \quad V_{i,n,m,2})^T$$

$$Z_{i,n} = (Z_{i,n,1} \quad Z_{i,n,2})^T$$

[Formula 25]

$$E[S_{i,n}^* Y_{i,n}^H] = E[|S_{i,n}|^2] w_{i,n,n}^H \quad (28)$$

$$E[Y_{i,n} Y_{i,n}^H] = E[|S_{i,n}|^2] W_{i,n,n} W_{i,n,n}^H +$$

$$\sum_{m=0,m\neq n}^{N-1} W_{i,n,m} W_{i,n,m}^H \Delta_{i,m} + \sum_{m=0}^{N-1} V_{i,n,m,0} V_{i,n,m,0}^H \Delta_{i-1,m} +$$

$$\sum_{m=0}^{N-1} V_{i,n,m,1} V_{i,n,m,1}^H \Delta_{i+1,m} + E[Z_{i,n} Z_{i,n}^H] \text{ where,}$$

$$\Delta_{i,n} = E[|S_{i,n}|^2] - |S''_{i,n}|^2$$

$$E[Z_{i,n} Z_{i,n}^H] = \sigma_z^2 \begin{pmatrix} 1 & \alpha_n \\ \alpha_n^* & 1 \end{pmatrix} \text{ where,} \quad (30)$$

$$\alpha_n = \frac{N - (D + N_g)}{N} \exp\left[-j\frac{2\pi n}{N}(D + N_g)\right]$$

Here, $^T$ denotes a transpose of a matrix.

In the first embodiment, the demodulator b109 calculates the demodulation symbol $S'_{i,n}$ using an approximate formula (34) that will be explained later.

The decoder b110 performs the decoding process on the bit log likelihood ratios $\lambda(b_{i,n,0})$ and $\lambda(b_{i,n,1})$ of the demodulation symbol $S'_{i,n}$ expressed by the formula (26). Thereafter, the iteration process is repeated. The iteration process explained above is repeated, thereby significantly improving the transmission performance.

The formula (30) is a formula in consideration of the correlation of noises due to overlapping of the front FFT duration and the rear FFT duration. On the other hand, approximation may be made by a formula without consideration of the noises due to the overlapping. In this case, the demodulator b109 calculates the demodulation symbol $S'_{i,n}$ using the following formula (31) in lieu of the formula (30).

[Formula 26]

$$E[Z_{i,n} Z_{i,n}^H] = \sigma_z^2 I_2 \quad (31)$$

$$I_2 = \begin{pmatrix} 1 & 0 \\ 0 & 1 \end{pmatrix}$$

Additionally, the formula (29) is a formula in precise consideration of the cancellation residual after the cancellation using the replicas of the reception signal, and also in consideration of the fact that preliminary information can be obtained by the decoding process and the fact that the powers of the modulation symbols on each subcarrier cannot be normalized to 1. On the other hand, the cancellation residual may be subjected to noise approximation so that the powers of the demodulation symbols are normalized to 1. In this case, the formulas (28) and (29) can be expressed by the following formulas (32) and (33).

[Formula 27]

$$E[S^*_{i,n} Y_{i,n}{}^H] = W_{i,n,n}{}^H \tag{32}$$

$$E[Y_{i,n} Y_{i,n}{}^H] = W_{i,n,n} W_{i,n,n}{}^H + (\sigma_z^2 + \sigma_{l'}^2) I_2 \tag{33}$$

If the formulas (32) and (33) and an inverse matrix lemma are used, the formula (26) can be expressed by the formula (34). In this case, the demodulator b109 calculates the demodulation symbol $S'_{i,n}$ using the following formula (34).

[Formula 28]

$$S'_{i,n} = E[S^*_{i,n} Y^H_{i,n}] E[Y_{i,n} Y^H_{i,n}]^{-1} Y_{i,n} = \frac{W^H_{i,n,n}}{W^H_{i,n,n} W_{i,n,n} + \sigma_z^2 + \sigma_{l'}^2} Y_{i,n} \tag{34}$$

In this case, the reception device b1 can reduce the amount of calculation.

Additionally, the ISI power and ICI power may be made identical to the noise power, and further the noise correlation may be taken into consideration. In this case, the formulas (29) and (30) can be expressed by the formula (33) and the following formula (35).

[Formula 29]

$$E[Y_{i,n} Y^H_{i,n}] = W_{i,n,n} W^H_{i,n,n} + (\sigma_z^2 + \sigma_{l'}^2) B_n \tag{35}$$

$$B_n = \begin{pmatrix} 1 & \alpha_n \\ \alpha_n^* & 1 \end{pmatrix}$$

If the formulas (33) and (35) and an inverse matrix lemma are used, the formula (26) can be expressed by the formula (36). In this case, the demodulator b109 calculates the demodulation symbol $S'_{i,n}$ using the following formula (36). In this case, the reception device b1 can reduce the number of inverse matrix computation.

[Formula 30]

$$S'_{i,n} = E[S^*_{i,n} Y^H_{i,n}] E[Y_{i,n} Y^H_{i,n}]^{-1} Y_{i,n} = \frac{W^H_{i,n,n} B_n^{-1}}{W^H_{i,n,n} B_n^{-1} W_{i,n,n} + \sigma_z^2 + \sigma_{l'}^2} Y_{i,n} \tag{36}$$

(Regarding Operation of Reception Device b1)

Figure 6:
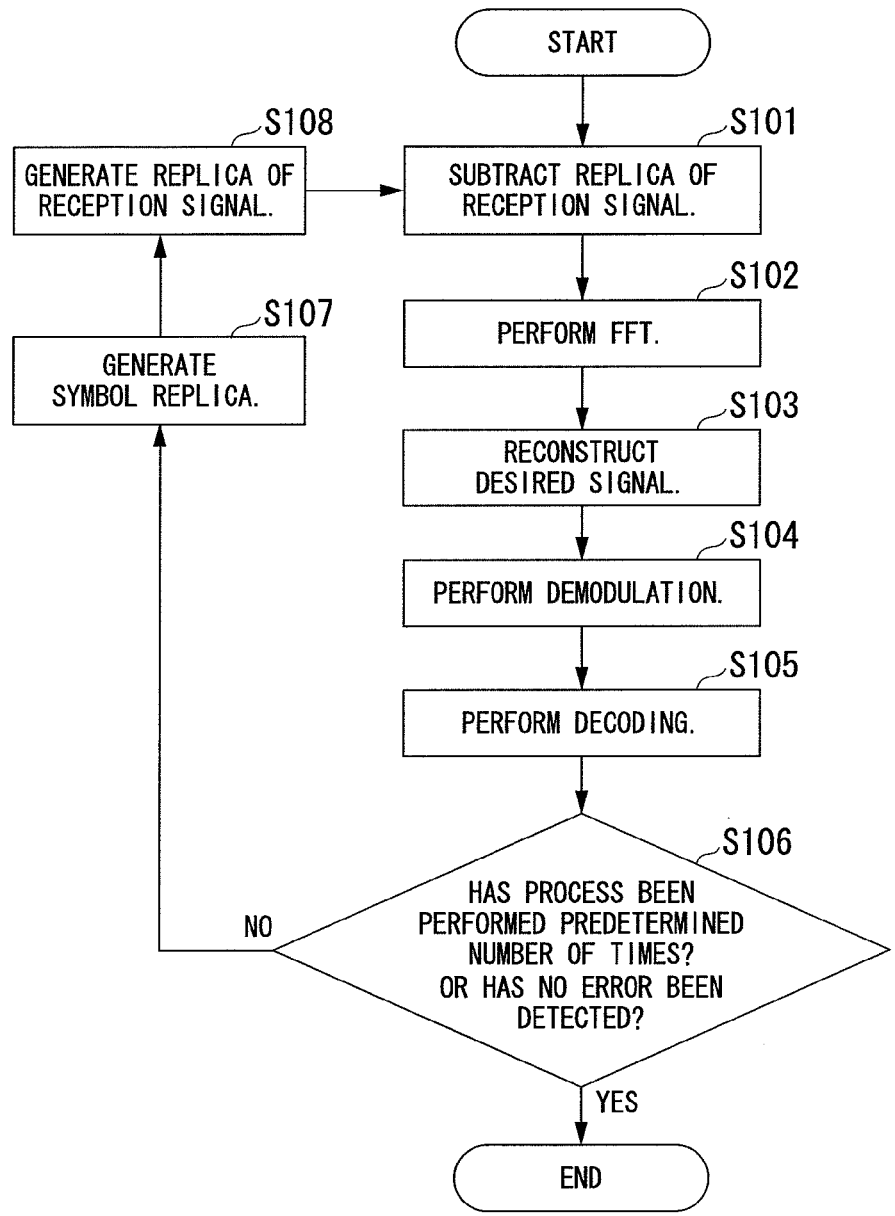
FIG. 6 is a flowchart illustrating operations of the reception device according to the first embodiment.

FIG. 6 is a flowchart illustrating operations of the reception device b1 according to the first embodiment. The operations shown in FIG. 6 are processes after the receiver b102 outputs the reception signal to the subtractor b103 for the first time.

(Step S101) The subtractor b103 subtracts from the reception signal, a replica of the reception signal generated in step S108 that will be explained later. Thereafter, the routine proceeds to step S102.

(Step S102) The FFT units b106-1 and b106-2 perform time-to-frequency conversion on signals in the FFT duration selected by the duration selector b104 from among the signals generated by the subtraction in step S101. Thereafter, the routine proceeds to step S103.

(Step S103) For each subcarrier, the reconstructors b108-1 and b108-2 add to the signals generated by the conversion in step S102, replica signals generated by multiplying the symbol replicas generated in step S107 that will be explained later by the frequency responses of the signals in the FFT duration selected by the duration selector b104. Thereafter, the routine proceeds to step S104.

(Step S104) The demodulator b109 performs channel compensation on the signals generated by the addition in step S103, and thereby calculates bit log likelihood ratios. Thereafter, the routine proceeds to step S105.

(Step S105) The decoder b110 performs a decoding process, such as error correction, on the bit log likelihood ratios generated by the calculation in step S104. Thereafter, the routine proceeds to step S106.

(Step S106) The decoder b110 determines whether no errors has been detected in the results of the decoding in step S105, or whether the process has been performed the predetermined number of time. If yes to either determination (YES), the reception device b1 terminates the operations. On the other hand, if no to both determinations (NO), the routine proceeds to step S107. Here, the determination of whether errors are included in the result of the decoding may be performed in a MAC (Media Access Control) layer.

(Step S107) The symbol replica generator b111 generates symbol replicas from the bit log likelihood ratios generated by the decoding in step S105. Thereafter, the routine proceeds to step S108.

(Step S108) The IFFT unit b112, the GI inserter b113, and the filter b114 generate the replicas of the reception signal based on the symbol replicas generated in step S107. Thereafter, the routine proceeds to step S101.

Thus, according to the first embodiment, the reception device b1 extracts each subcarrier element of the reception signal from which the ISI and the ICI are cancelled. Then, the reception device b1 demodulates the signal on the extracted subcarrier element. Thereby, the reception device b1 can prevent an increase in the amount of calculation.

Explanations have been given in the first embodiment with respect to the case in which the filter unit b114 generates the replicas of the reception signal, the subtractor b103 subtracts those replicas of the reception signal, and the reconstructors b108-1 and b108-2 add the replica signals of the desired signal and perform demodulation for each subcarrier. If the maximum delay does not exceed the GI, however, the present invention is not limited thereto. The filter unit b114 may generate signal replicas by subtracting the reception signal corresponding to the desired signal from the reception signals, and the subtractor b103 may subtract that signal replicas, and thus may perform the demodulation process for each subcarrier.

In this case, the above formula (14) can be replaced with the following formulas (37) and (38).

[Formula 31]

$$r'_k = r_k - \sum_{d=0}^{D} h'_{d,k} s''_{k-d} \tag{37}$$

$$h'_{d,k} = h_{d,k} - \frac{1}{N} \sum_{k=N_g}^{N+N_g-1} h_{d,k} \tag{38}$$

Additionally, explanations are given in the first embodiment with respect to the case in which the communication system performs multi-carrier communication. However, the present invention is not limited thereto, and is applicable to a case in which single-carrier communication using the FFT is performed.

Further, in the first embodiment, subcarriers around the desired subcarrier may be reconstructed and be subjected to the demodulation. For example, the reconstructors b108-1 and b108-2 add the replica signals $W_{i,n,m,1}S''_{i,n}$ and $W_{i,n,m,2}S''_{i,n}$ of the desired signal when the signals expressed by the formulas (24) and (25) are generated. Regarding the reception signal, the desired signal leaks into the neighboring subcarriers. For this reason, the reception device b1 combines these neighboring subcarriers, thereby improving the SINR.

Second Embodiment

Hereinafter, a second embodiment of the present invention is explained in detail with reference to the drawings. The explanations have been given in the first embodiment with the respect to case in which the reception device b1 extracts signals in two FFT durations, which are the front FFT duration and the rear FFT duration, and thereafter demodulates and decodes the extracted signals. In the second embodiment, explanations are given with respect to a case in which a reception device extracts signals in $N_B$ FFT durations, and demodulates and decodes the extracted signals.

The conceptual diagram of the communication system according to the second embodiment is the same as that of the first embodiment (FIG. 1), and therefore explanations thereof are omitted here. A transmission device A according to the second embodiment is the same as the transmission device a1 according to the first embodiment, and therefore explanations thereof are omitted here. Hereinafter, the reception device B is referred to as a reception device b2 in the second embodiment.

Figure 7:
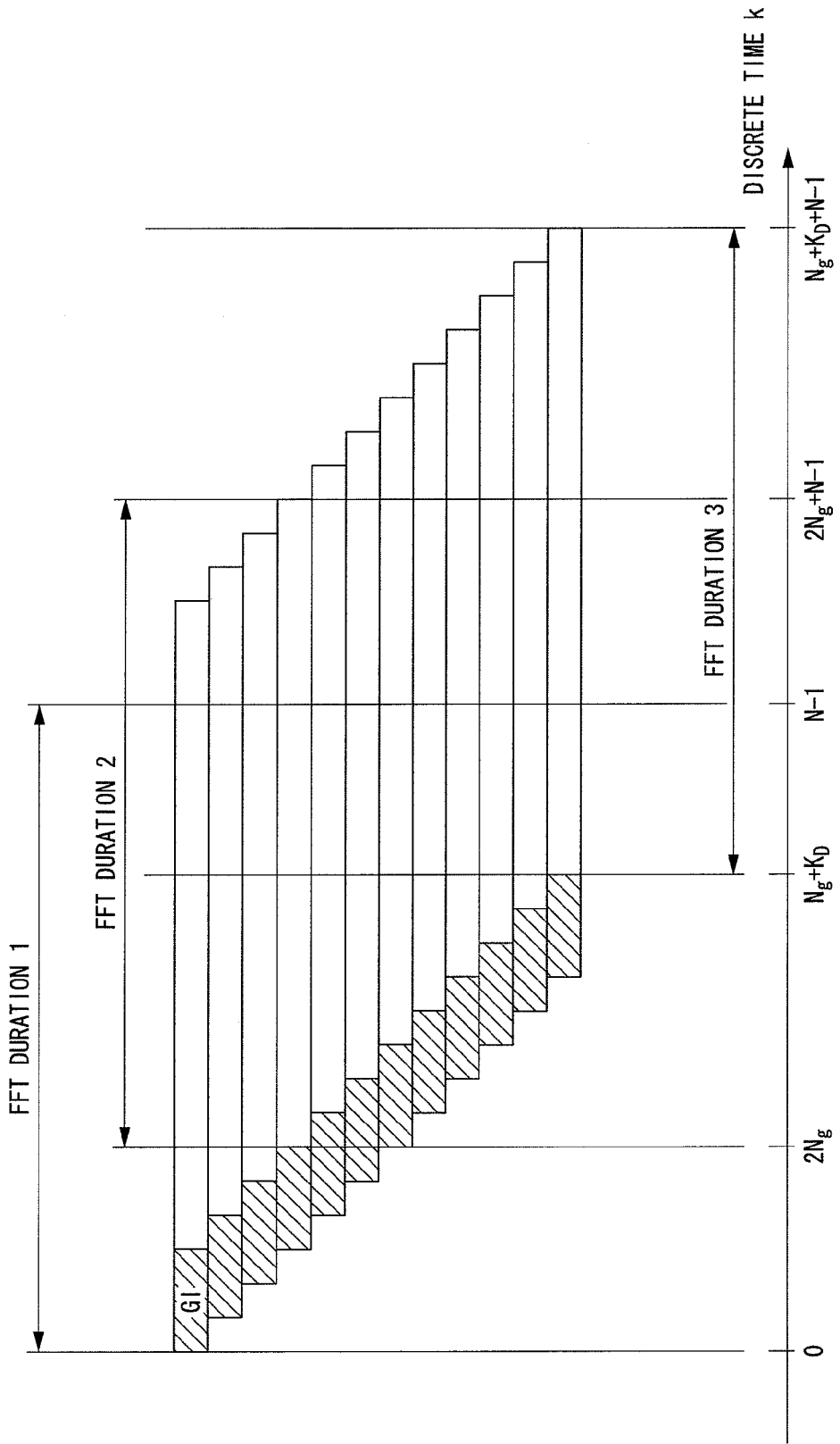
FIG. 7 is a schematic diagram illustrating an example of FFT durations to be selected by a reception device according to a second embodiment of the present invention.

FIG. 7 is a schematic diagram illustrating an example of FFT durations selected by the reception device b2 according to the second embodiment. In FIG. 7, reception signals are the same as those of the example (FIG. 5).

FIG. 7 illustrates the case in which the reception device b2 extracts signals in the $N_B$ (=3) FFT durations. Specifically, in the example shown in FIG. 7, the reception device b2 selects the front FFT duration and the rear FFT duration of the first embodiment while regarding these durations as the FFT durations f=1, 3, and further selects the FFT duration f=2 (hereinafter, f is referred to as the duration number).

Figure 8:
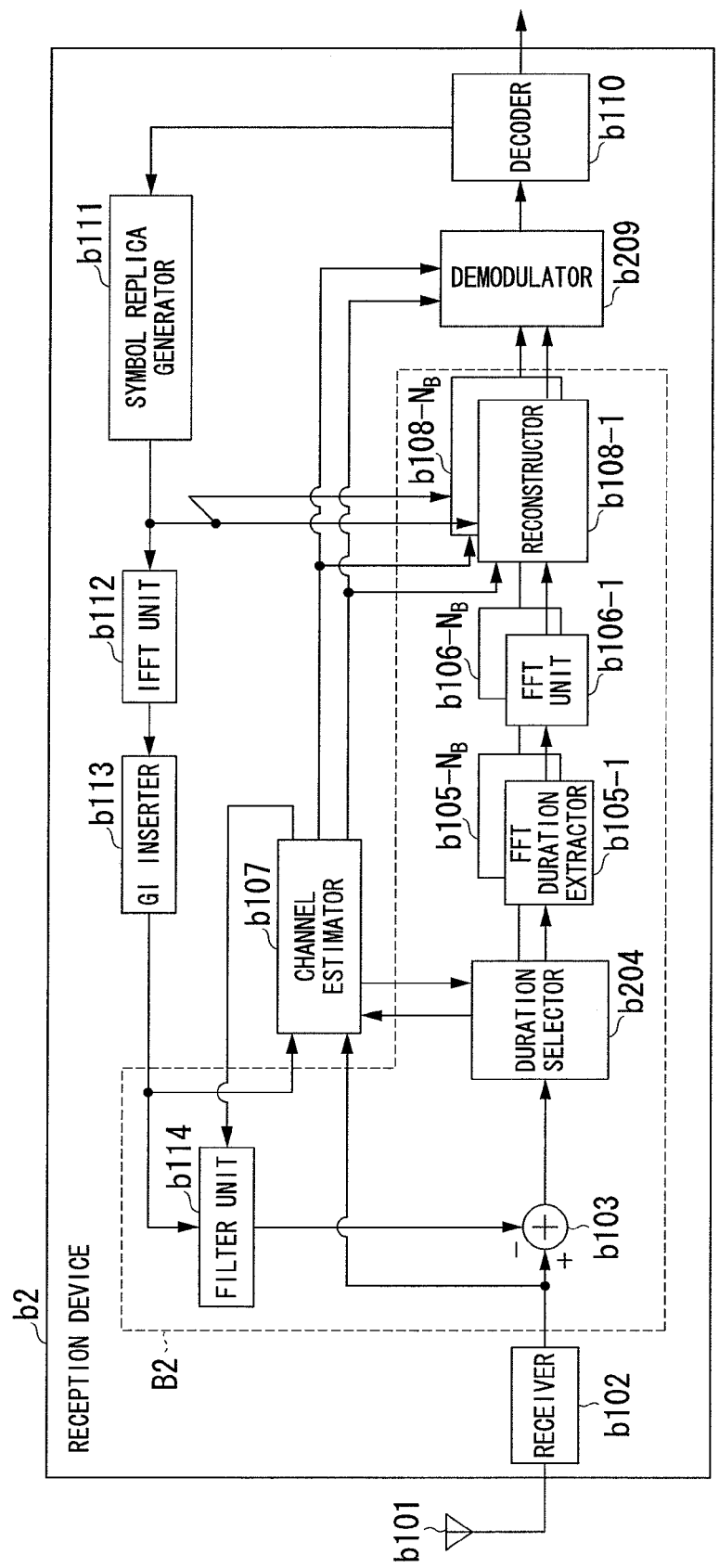
FIG. 8 is a schematic block diagram illustrating a configuration of a reception device according to the second embodiment.

FIG. 8 is a schematic block diagram illustrating a configuration of the reception device b2 according to the second embodiment. If the reception device b2 according to the second embodiment (FIG. 8) is compared to the reception device b1 according to the first embodiment (FIG. 3), a duration selector b204 of a signal extractor B2 and a demodulator b209 differ. Additionally, there is a difference in that the reception device b2 includes $N_B$ sets of FFT duration extractors b105-f, FFT units b106-f, and reconstructors b108-f (f=1, 2, ..., $N_B$), and that signals in the FFT duration allocated with the duration number f are extracted. However, other constituent elements (the reception antenna b101, the receiver b102, the subtractor b103, the decoder b110, the symbol replica generator b111, the IFFT unit b112, the GI inserter b113, and the filter a114) have the same functions as those of the first embodiment. Further, the FFT duration extractors b105-f, the FFT units b106-f, and the reconstructors b108-f have the same functions as those of the FFT duration extractor b105-1, the FFT unit b106-1, and the reconstructor b108-1 according to the first embodiment. Explanations of the same functions as those of the first embodiment are omitted here.

The duration selector b204 determines whether or not there is a delay path whose delay exceeds the GI, based on the channel impulse response received from the channel estimator b107. If there is no delay path whose delay exceeds the GI, the reception device b2 performs the within-GI delay process in a similar manner to the first embodiment.

If there is a delay path whose delay exceeds the GI, on the other hand, the duration selector b204 selects a predetermined number ($N_B$) of FFT durations f.

The duration selector b204 outputs selected duration information indicating the selected FFT durations to the channel estimator b107, the FFT duration extractors b105-1 to b105-$N_B$, and the symbol replica generator b111. Here, the duration selector b204 outputs to the FFT duration extractors b105-f, selected duration information indicating the FFT duration f.

Additionally, in this case, the duration selector b204 outputs to the FFT duration extractors b105-1 to b105-$N_B$, the signal received from the subtractor b103. In this case, the process performed by each unit of the reception device b1 is referred to as "over-GI delay process."

Using the frequency response received from the channel estimator b107, the noise power, and the ICI power, the demodulator b209 calculates a filter coefficient based on the ZF criterion, the MMSE criterion, or the like. The demodulator b209 performs channel compensation using the calculated filter coefficient. The demodulator b209 demaps the signal subjected to the channel compensation, based on mapping information previously reported from the transmission device a1. Then, the demodulator b209 performs a demodulation process on the demapped signal. The demodulator b209 outputs to the decoder b110, bit log likelihood ratios generated by the demodulation.

(Regarding Operation Principle)

Each of the reconstructors b108-f multiplies the symbol replica $S''_{i,n}$ by the frequency response $W_{i,n,n,f}$ to generate the replica signal $W_{i,n,n,f}S''_{i,n}$ of the desired signal affected by the channel. When the result $R'_{i,n,f}$ of the FFT with respect to the FFT duration f performed on the signal $r'_{i,k}$ expressed by the formula (14) is expressed by the formula (39), each of the reconstructors b108-f multiplies the result $R'_{i,n,f}$ by the generated replica signal $W_{i,n,n,f}S''_{i,n}$. The signal $Y_{i,n,f}$ generated by the addition can be expressed by the following formula (40).

[Formula 32]

$$R'_{i,n,f} = \frac{1}{\sqrt{N}} \sum_{k=f_0}^{f_0+N-1} r'_{i,k} \exp\left[-j\frac{2\pi n}{N}(k-N_g)\right] \quad (39)$$

$$= W_{i,n,n,f}(S_{i,n} - S''_{i,n}) + \sum_{m=0,m\neq n}^{N-1} W_{i,n,m,f}(S_{i,m} - S''_{i,m}) +$$

$$\sum_{m=0}^{N-1} V_{i,n,m,f}(S_{i-1,m} - S''_{i-1,m}) +$$

$$\sum_{m=0}^{N-1} V'_{i,n,m,f}(S_{i+1,m} - S''_{i+1,m}) + Z_{i,n,f}$$

-continued $$Y_{i,n,f} = R'_{i,n,f} + W_{i,n,n,f} S''_{i,n} \quad (40)$$

$$= W_{i,n,n,f} S_{i,n} + \sum_{m=0, m \neq n}^{N-1} W_{i,n,m,f}(S_{i,m} - S''_{i,m}) +$$

$$\sum_{m=0}^{N-1} V_{i,n,m,f}(S_{i-1,m} - S''_{i-1,m}) +$$

$$\sum_{m=0}^{N-1} V'_{i,n,m,f}(S_{i+1,m} - S''_{i+1,m}) + Z_{i,n,f}$$

Here, $f_0$ denotes the discrete time of the head of the FFT duration f. $W_{i, n, m, f}$ is a coefficient of ICI caused by the previous and next symbols in the FFT duration f, and which indicates a leaking coefficient of leaking from the m-th subcarrier into the n-th subcarrier.

The demodulator b109 calculates the demodulation symbol $S'_{i, n}$ using the formula (34). Here, vectors $Y_{i, n}$ and vectors $W_{i, n, m}$ can be expressed by the following formulas (41) and (42).

[Formula 33]

$$Y_{i,n} = (Y_{i,n,1} Y_{i,n,N_B})^T \quad (41)$$

$$W_{i,n,m} = (W_{i,n,m,1} W_{i,n,m,N_B})^T \quad (42)$$

(Regarding Operation of Reception Device b2)

Figure 9:
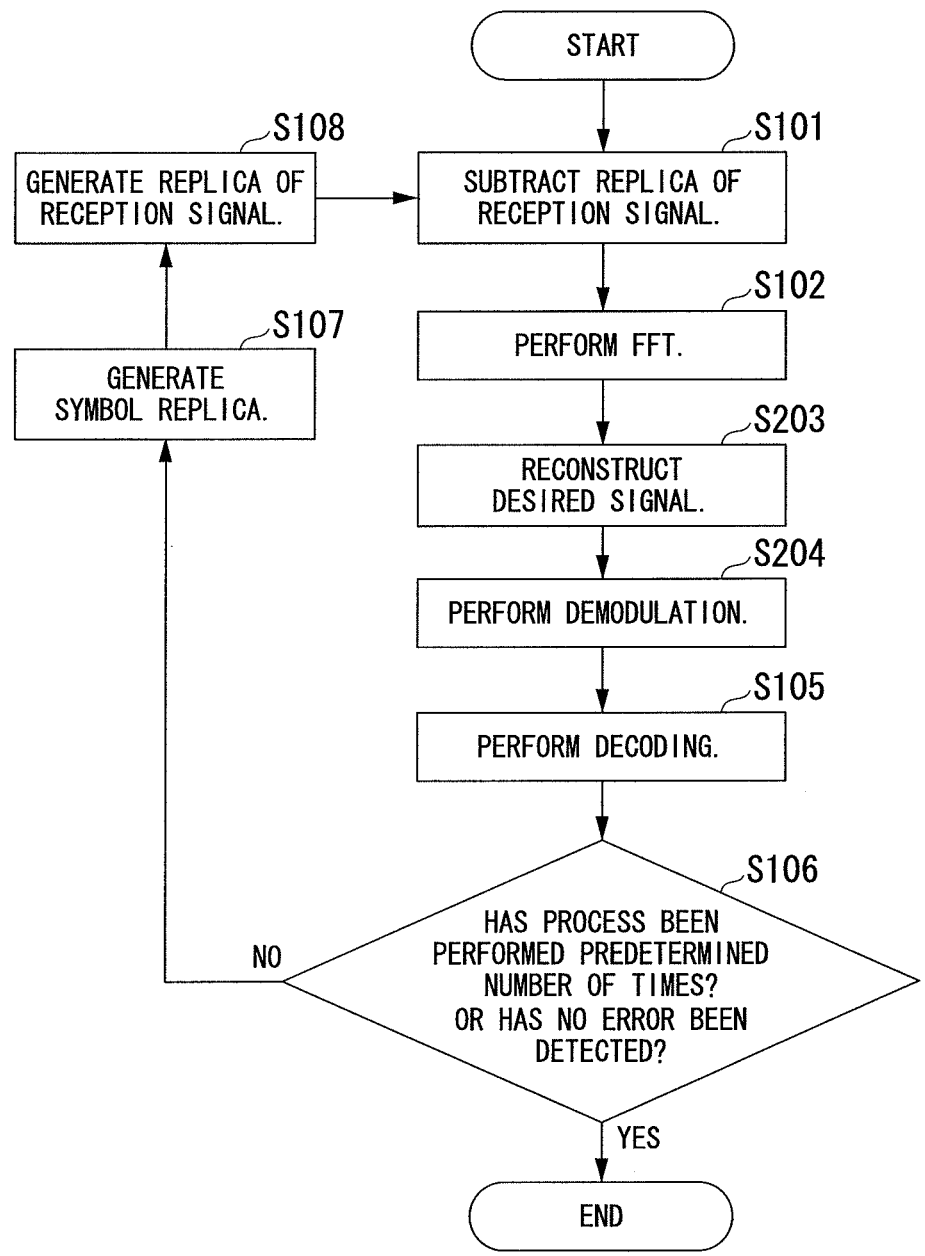
FIG. 9 is a flowchart illustrating operations of the reception device according to the second embodiment.

FIG. 9 is a flowchart illustrating operations of the reception device b2 according to the second embodiment. The operations shown in FIG. 9 are processes after the receiver b102 shown in FIG. 8 outputs a reception signal to the subtractor b103 for the first time.

If the operations of the reception device b2 according to the second embodiment (FIG. 9) are compared to the operations of the reception device b1 according to the first embodiment (FIG. 6), the processes from steps S202 to S204 differ. However, other processes (steps S101, S105 to S108) are the same as those of the first embodiment. Explanations of the same processes as those of the first embodiment are omitted here.

(Step S202) The FFT unit b106-f performs time-to-frequency conversion on the signals generated by the subtraction in step S101, with respect to the FFT duration f selected by the duration selector b204. Thereafter, the routine proceeds to step S203.

(Step S203) For each subcarrier, the reconstructor b108-f adds to the signals generated by the conversion in step S202, the replica signals obtained by multiplying the symbol replicas generated in step S107 by the frequency responses in the FFT duration f selected by the duration selector b104. Thereafter, the routine proceeds to step S204.

(Step S204) The demodulator b209 performs channel compensation on the signals generated by the addition in step S203 to calculate bit log likelihood ratios. Thereafter, the routine proceeds to step S105.

In the case of FIG. 5 of the first embodiment, the preceding path in its entirety is extracted in the front FFT duration without any deficiency, and the maximum delay path in its entirety is extracted in the rear FFT duration. Regarding the other paths, however, deficiencies occur in both the durations. It is desirable to solve these deficiencies by combining two FFT durations. For this solution, it is necessary to precisely consider the correlation of noises caused by overlapping of the two durations, and the like. As explained in the first embodiment, it is easy to consider the correlation with respect to the same subcarrier in two FFT duration. However, there are correlations with respect to all subcarriers in actual case, and it is not practical to consider the correlations in view of the amount of calculation.

According to the second embodiment, however, the effect of the deficiencies occurring to the paths is removed by increasing the number of FFT durations. In the case of FIG. 7, no deficiencies occur to the fourth to seventh paths in the FFT duration 2. In such a manner, performance of power combining is enhanced, thereby improving the performance.

As explained above, in the second embodiment, it is possible to reduce the deficiencies occurring to paths depending on the settings of FFT durations, and to reduce the effect due to the invasion of the previous and next symbol durations.

The case of $N_B = 3$ has been explained in the second embodiment. However, the present invention is not limited thereto and is applicable to the case of $N_B \geq 4$. For example, it is possible to regard $N_B$ as the number of all paths ($N_B = 12$ in the case of FIG. 7).

Regarding a value of $N_B$, a predetermined value may be stored in the storing unit of the reception device b2 when the reception device b2 is manufactured. Alternatively, the transmission device a1 may determine, transmit, and store the value in the storing unit of the reception device b2. Alternatively, the reception device b2 may determine the value of $N_B$ according to the channel conditions. For example, the reception device b2 may determine the value of $N_B$ based on the length of a delay time of a delay path or the number of delay paths. Even if $N_B = 3$, sufficient effects can be expected.

Modified Example

Explanations have been given with reference to FIG. 7 with respect to the case in which the FFT duration (FFT duration 2) is additionally selected, as well as the two FFT durations, which are the front FFT duration (FFT duration 1) and the rear FFT duration (FFT duration 3). However, the present invention is not limited thereto, and may not use such a configuration in which the start of the FFT duration 1 corresponds to the head of the preceding wave, and the end of the FFT duration 3 corresponds to the end of the signal in the maximum delay path.

Figure 10:
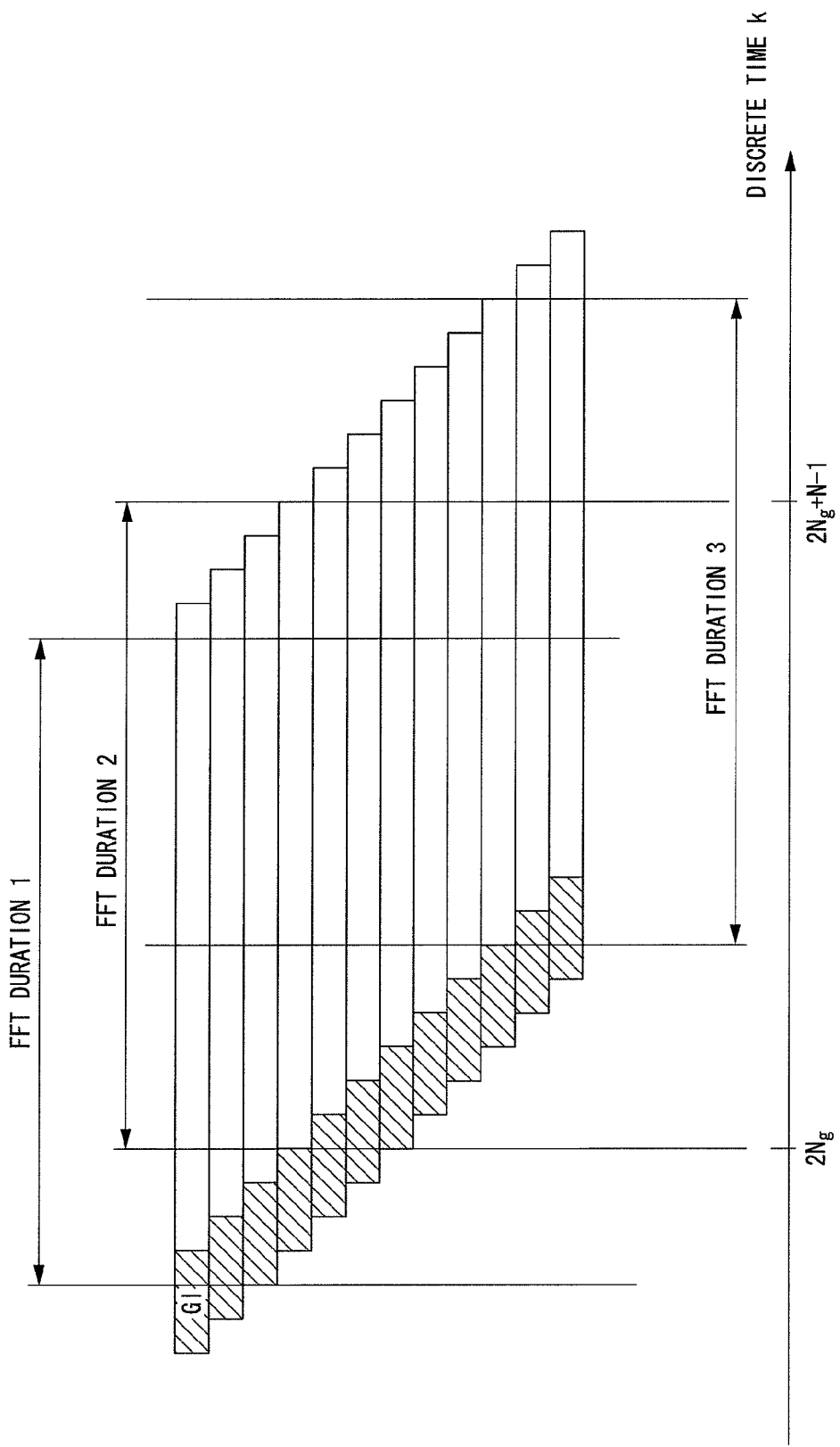
FIG. 10 is a schematic diagram illustrating another example of FFT durations to be selected by the reception device according to the second embodiment.

FIG. 10 is a schematic diagram illustrating another example of FFT durations selected by the reception device b2 according to the second embodiment. In FIG. 10, the reception signals are the same as those of the FIG. 7. FIG. 10 illustrates a case in which the reception device b2 extracts signals in the FFT durations where the number of FFT durations $N_B = 3$.

Specifically, in the case of FIG. 10, the reception device b2 selects the start of the FFT duration 1 as corresponding to the head of the third path (channel number d=2). Additionally, the reception device b2 selects the end of the FFT duration 3 as corresponding to the end of the tenth path (channel number d=9) (the start of the FFT duration 3 may correspond to the end of the GI in the tenth path). In such a manner, the reception device b2 can reduce the amount of the invasion of the previous and next symbol durations, thereby reducing the effect of ISI cancelling residual.

Third Embodiment

Hereinafter, a third embodiment of the present invention is explained in detail with reference to the drawings. Explanations are given in the third embodiment with respect to a case in which a communication system performs MIMO (Multiple Input Multiple Output) communication.

The conceptual diagram of the communication system according to the third embodiment is the same as that of the first embodiment (FIG. 1), and therefore explanations thereof are omitted here. Hereinafter, in the third embodiment, the transmission device A is denoted as a transmission device a3, and the reception device B is denoted as a reception device b3. Explanations are given in the third embodiment with respect to a case in which the reception device b3 including R antennas receives signals transmitted by the transmission device a3 including T antennas. Here, the reception device b3 receives, through the R antennas, T streams transmitted by the transmission device a3 through the T antennas, and performs MIMO separation.

(Regarding Configuration of Transmission Device a3)

Figure 11:
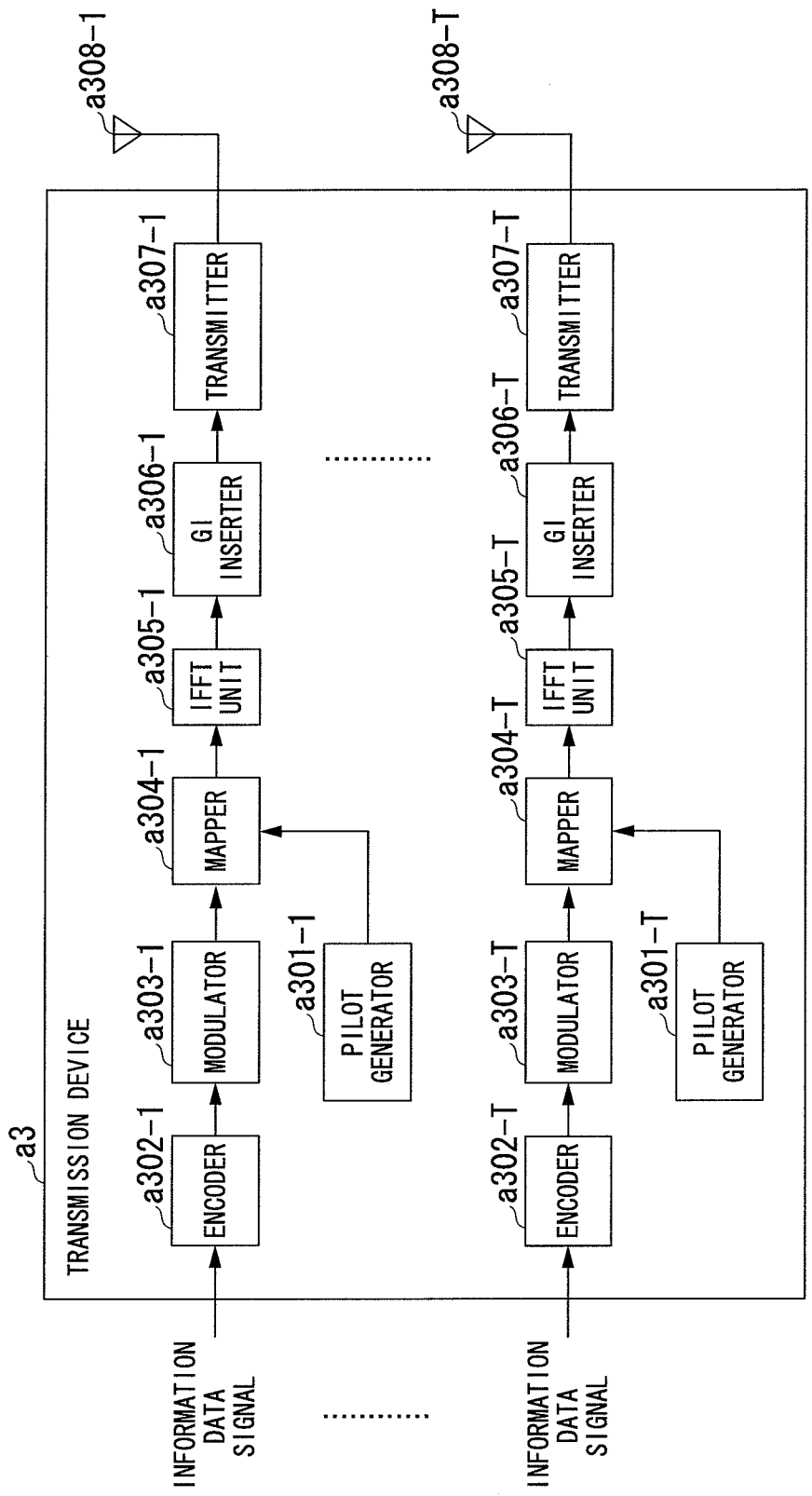
FIG. 11 is a schematic block diagram illustrating a configuration of a transmission device according to a third embodiment of the present invention.

FIG. 11 is a schematic block diagram illustrating a configuration of the transmission device a3 according to the third embodiment. In FIG. 11, the transmission device a3 includes: pilot generators a301-$t$ ($t$=1, 2, ..., T, likewise hereinafter); encoders a302-$t$; modulators a303-$t$; mappers a304-$t$; IFFT units a305-$t$; GI inserters a306-$t$; transmitters a307-$t$; and transmission antenna units a308-$t$.

The pilot generator a301-$t$ generates a pilot signal having a waveform (or a signal stream), an amplitude value of which is previously stored by the reception device b3. Then, the pilot generator a304-$t$ outputs the generated pilot signal to the mapper a304-$t$.

The encoder a302-$t$ encodes information bits to be transmitted to the reception device b3, using an error correction code, such as a convolutional code, a turbo code, or an LDPC code, and thereby generates encoded bits. The encoder a302-$t$ outputs the generated encoded bits to the modulator a303-$t$.

The modulator a303-$t$ modulates the encoded bits received from the encoder a302-$t$, using a modulation scheme, such as PSK or QAM, and thereby generates modulation symbols. The modulator a303-$t$ outputs the generated modulation symbols to the mapper a304-$t$.

The mapper a304-$t$ maps the pilot signal received from the pilot generator a301-$t$ and the modulation symbols received from the modulator a303-$t$ to resources based on predetermined mapping information, and thereby generates frequency-domain signals. Then, the mapper a304-$t$ outputs the generated frequency-domain signals to the IFFT unit a305-$t$. Additionally, the mapping information is determined by the transmission device a3, and is previously reported from the transmission device a3 to the reception device b3.

The IFFT unit a305-$t$ performs frequency-to-time conversion on the frequency-domain signal received from the mapper a304-$t$, and thereby generates a time-domain signal. The IFFT unit a305-$t$ outputs the generated time-domain signal to the GI inserter a306-$t$.

The GI inserter a306-$t$ adds, for each signal in the FFT duration, a guard interval to the time-domain signal received from the IFFT unit a305-$t$. Here, the guard interval denotes a duplicate of part of a rear portion of the signal in the FFT duration, and the GI inserter a306-$t$ adds the duplicated signal to the head of the signal in the FFT duration.

The GI inserter a306-$t$ outputs to the transmitter a307-$t$, the signal to which the guard interval is added.

The transmitter a307-$t$ performs digital-to-analog conversion on the signal received from the GI inserter a306-$t$, and performs waveform shaping on the analog signal generated by the conversion. The transmitter a307-$t$ upconverts the signal subjected to the waveform shaping, from a baseband signal to a radio frequency signal. Then, the transmitter a307-$t$ transmits the upconverted signal from the transmission antenna a308-$t$ to the reception device b3.

(Regarding Configuration of Reception Device b3)

Figure 12:
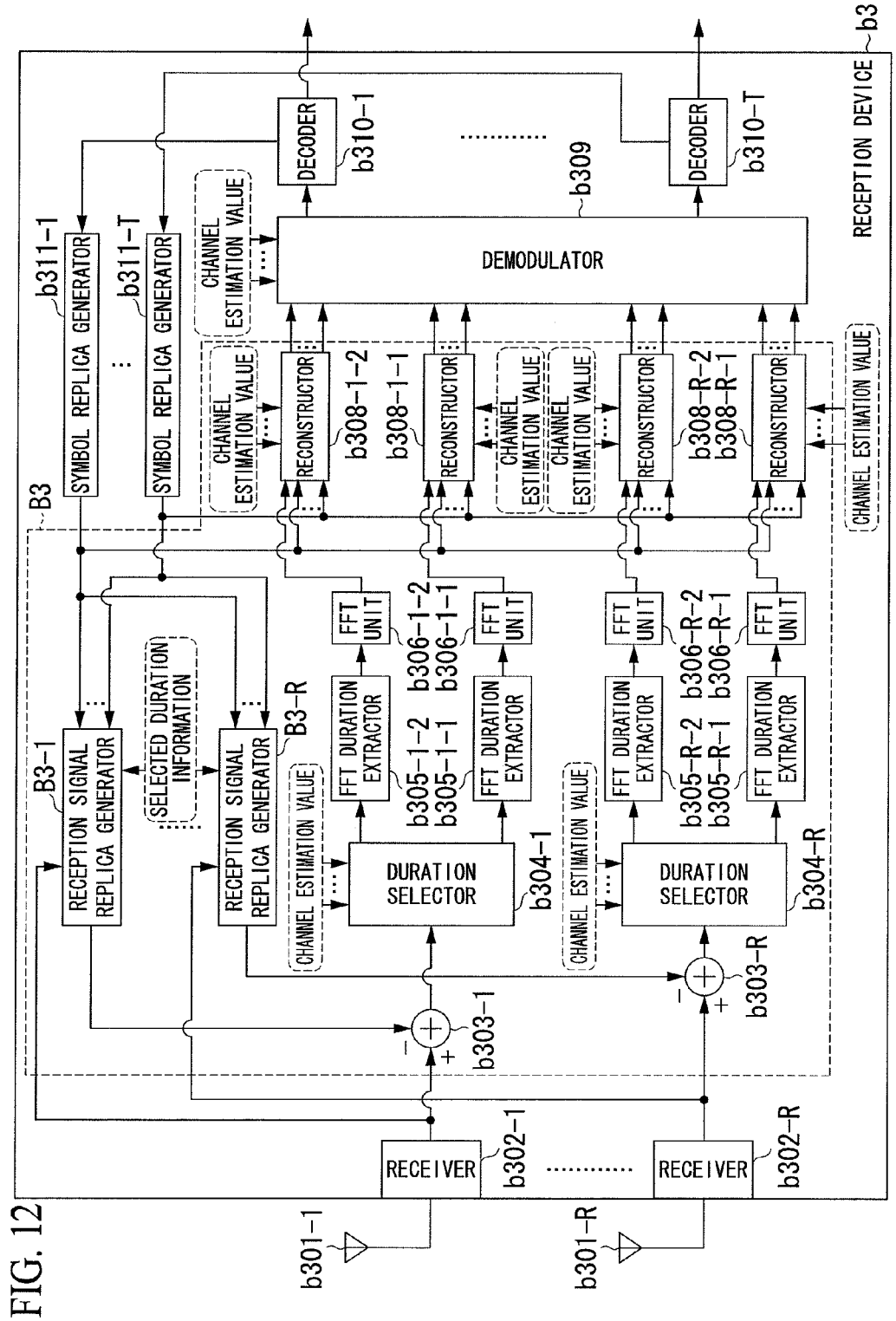
FIG. 12 is a schematic block diagram illustrating a configuration of a reception device according to the third embodiment.

FIG. 12 is a schematic block diagram illustrating a configuration of the reception device b3 according to the third embodiment. In FIG. 12, the reception device b3 includes: reception antennas b301-$r$ ($r$=1, 2, ..., R, likewise hereinafter); receivers b302-$r$; subtractors b303-$r$; duration selectors b304-$r$; FFT duration extractors b305-$r$-1 and b305-$r$-2; FFT units b306-$r$-1 and b306-$r$-2; reception signal replica generators B3-$r$; reconstructors b308-$r$-1 and b308-$r$-2; a demodulator b309; decoders b310-$t$; and symbol replica generators b311-$t$. Here, the subtractors b303-1 to b303-R, the FFT duration extractors b305-1 to b305-R, the FFT units b306-1 to b306-R, the reconstructors b308-1 and b308-R, and the reception signal replica generators B3-1 to B3-R (filter units b314-1 to b314-R that will be explained later) form a signal extractor B3.

The receiver b302-$r$ receives, through the reception antenna b301-$r$, a transmission signal transmitted by the transmission device a3. The receiver b302-$r$ performs frequency conversion and analog-to-digital conversion on the received signal. The receiver b302-$r$ stores the reception signal subjected to the conversions. The receiver b302-$r$ outputs the stored reception signal to the subtractor b303-$r$ and the reception signal replica generator B3-$r$ in the initial process and in the timing in which a filter unit b314-$r$ that will be explained later inputs a replica of the reception signal to the subtractor b303-$r$.

The subtractor b303-$r$ subtracts from the reception signal received from the receiver b302-$r$, the replica of the reception signal received from the reception signal replica generator B3-$r$ that will be explained later. The subtractor b303-$r$ outputs to the duration selector b304-$r$, the signal from which the replica of the reception signal is subtracted.

Here, in the initial process, the subtractor b303-$r$ receives no input (zero) from the reception signal replica generator B3-$r$, and outputs to the duration selector b304-$r$, the reception signal received from the receiver b302-$r$ as it is.

The duration selector b304-$r$ determines whether or not there is a delayed path whose delay exceeds the GI, based on a channel impulse response received from the reception signal replica generator B3-$r$ that will be explained later.

If there is no delayed path whose delay exceeds the GI, the duration selector b304-$r$ outputs selected duration information indicating an FFT duration of the preceding wave, to the reception signal replica generator B3-$r$, the FFT duration extractors b305-$r$-1 and b305-$r$-2, and the symbol replica generator b311-$r$. Additionally, in this case, the duration selector b304-$r$ outputs to the FFT duration extractor b305-$r$-1, the signal received from the subtractor b303-$r$. Here, in this case, the process performed by each unit of the reception device b3 is referred to as a "within-GI delay process." Further, in the initial process, the duration selector b304-$r$ outputs to the FFT duration extractor b305-$r$-1, the signal received from the subtractor b303-$r$.

If there is a delayed path whose delay exceeds the GI, on the other hand, the duration selector b304-$r$ selects a duration having the length of the FFT duration measured from the front of the preceding wave (the front FFT duration), and an FFT duration of a signal received by way of the path d=D, that is, the maximum delay path (the rear FFT duration). The duration selector b304-$r$ outputs selected duration information indicating the selected FFT duration, to the reception signal replica generator B3-$r$, the FFT duration extractors b305-$r$-1 and b305-$r$-2, and the symbol replica generator b311-$r$. Here, the duration selector b304-$r$ outputs to the FFT duration extractor b305-$r$-1, the selected duration information indicating the front FFT duration. Further, the duration selector b304-r outputs to the FFT duration extractor b305-r-2, the selected duration information indicating the rear FFT duration.

Additionally, in this case, the duration selector b304-r outputs the signal received from the subtractor b303-r, to the FFT duration extractors b305-r-1 and b305-r-2. Further, in this case, the process performed by each unit of the reception device b3 is referred to as an "over-GI delay process."

The FFT duration extractors b305-r-1 and b305-r-2 extract from the signals received from the duration selector b304-r, signals in the FFT duration indicated by the selected duration information (the FFT duration of the preceding wave, or the front FFT duration). The FFT duration extractors b305-r-1 and b305-r-2 output the extracted signals to the FFT units b306-r-1 and b306-r-2, respectively. Here, in the initial process, the FFT duration extractor b306-r-1 extracts a signal in the FFT duration of the preceding wave.

The FFT units b306-r-1 and b306-r-2 perform time-to-frequency conversion on the time-domain signals received from the FFT duration extractors b305-r-1 and b305-r-2, respectively. Then, the FFT units b306-r-1 and b306-r-2 outputs the frequency-domain signals generated by the conversion, to the reconstructors b308-r-1 and the b308-r-2.

The reception signal replica generator B3-r estimates a frequency response from each antenna a308-t (t-th antenna) of the transmission device a3 to the antenna b301-r (r-th antenna), and outputs the estimated frequency response to the reconstructors b308-r-1 and b3-8-r-2, and the demodulator b309. Additionally, the reception signal replica generator B3-r calculates the noise power and the ICI power, and outputs the calculated powers to the demodulator b309.

Further, the reception signal replica generator B3-r generates from the symbol replica received from the symbol replica generator b311-t, a reception signal replica of the reception signal received from the r-th antenna. Then, the reception signal replica generator B3-r outputs the generated reception signal replica to the subtractor b303-r. The details of the configuration and process of the reception signal replica generator B3-r will be explained later.

Each of the reconstructors b308-r-1 and b308-r-2 multiplies, for each subcarrier, the symbol replica received from the symbol replica generator b311-t that will be explained later, by the frequency response received from the channel estimator b307, and thereby generates a replica signal of the desired signal affected by the channel. Each of the reconstructors b308-r-1 and b308-r-2 adds, for each subcarrier, the replica signal generated to the associated one of the signals received from the FFT units b306-r-1 and b306-r-2. In other words, the reconstructors b308-r-1 and b308-r-2 extract subcarrier elements of the frequency-domain signals generated by the FFT units b306-r-1 and b306-r-2 performing the conversion. Then, the reconstructors b308-r-1 and b308-r-2 add to the signals on the extracted subcarrier elements, elements of the desired stream (t-th stream) among the subcarrier elements of the replica signal of the desired signal. Then, the reconstructors b308-r-1 and the b308-r-2 output to the demodulator b109, the signals to which the replica signals are added.

In the case of the initial process, the reconstructors b308-r-1 and b308-r-2 receive no inputs (zero) from the symbol replica generator b311-t, and the symbol replica generator b311-t outputs the signals received from the FFT units b306-r-1 and b306-r-2 to the demodulator b309 as they are.

Using the frequency response, the noise power, and the ICI power which are received from the channel estimator b307-r, the demodulator b309 calculates a filter coefficient based on the ZF criterion, the MMSE criterion, or the like. Using the calculated filter coefficient, the demodulator b309 performs channel compensation. The demodulator b309 demaps the signal subjected to the channel compensation, based on mapping information previously reported from the transmission device a3, and performs a demodulation process on the demapped signal. With respect to signals of the transmission signal stream (t-th stream) transmitted from the t-th antenna, the demodulator b309 outputs to the decoder b310-t, the bit log likelihood ratios that are the results of the demodulation process.

The decoder b310-t performs a decoding process on the demodulation symbols received from the demodulator b309, using the maximum likelihood decoding, the maximum a posteriori probability, the log-MAP, the Max-log-MAP, SOVA, or the like.

If it is determined as a result of the decoding process that no errors are detected or that the process has been performed the predetermined number of times, the decoder b310-t outputs the bit log likelihood ratios that are the results of the decoding, as information data bits. If it is determined that an error is detected and that the process has not yet been performed the predetermined number of times, on the other hand, the decoder b310-t outputs to the symbol replica generator b311-t, the bit log likelihood ratios that are the results of the decoding.

The symbol replica generator b311-t calculates expectation values of the bit log likelihood ratios received from the decoder b310-t, modulates the calculated expectation values, and thereby generates symbol replicas. The symbol replica generator b311-t maps the generated symbol replicas based on the mapping information previously reported from the transmission device a3. The symbol replica generator b311-t outputs the mapped symbol replicas to the reconstructors b308-1 to b308-R, and the reception signal replica generators B3-1 to B3-R.

Figure 13:
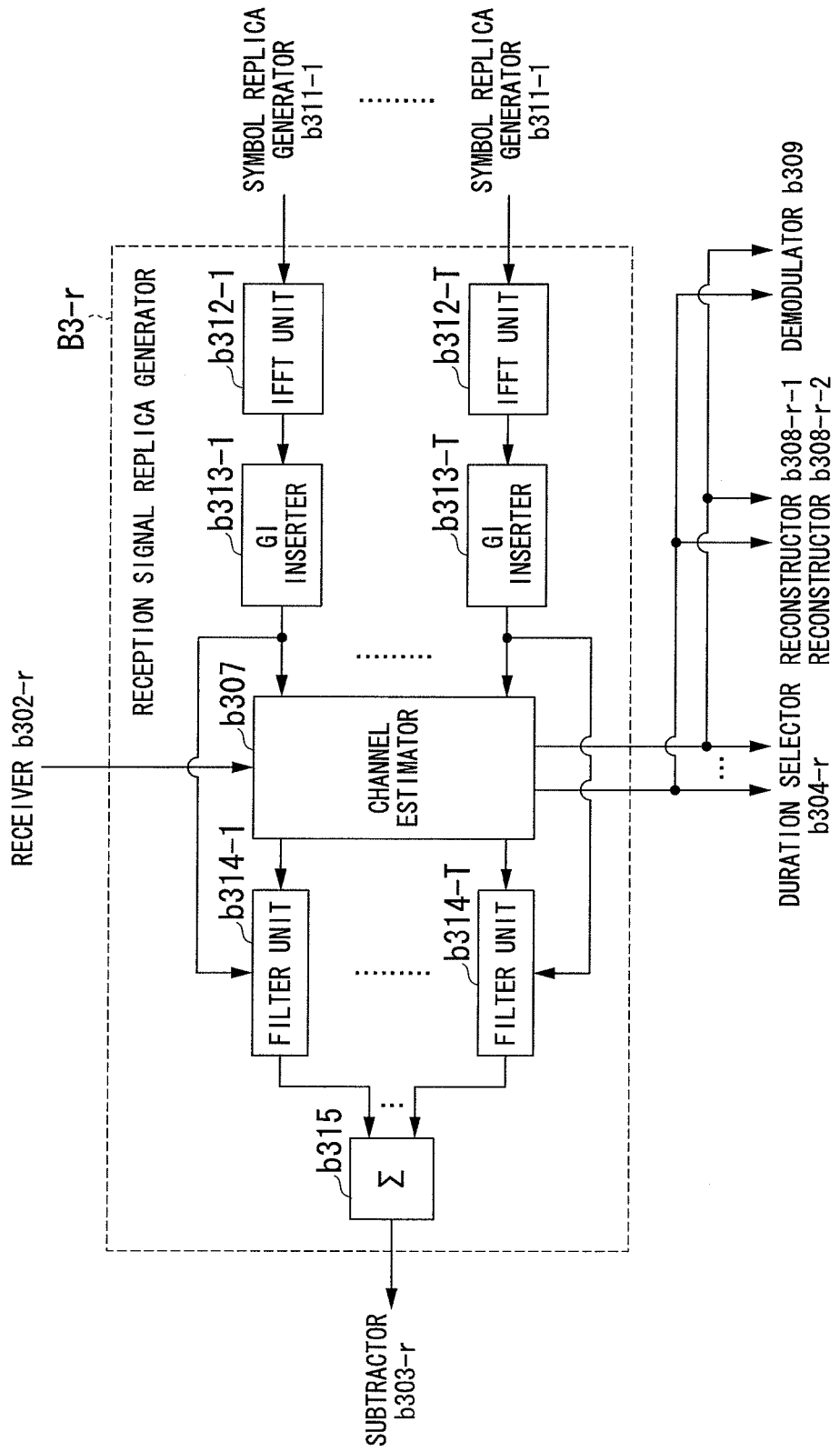
FIG. 13 is a schematic block diagram illustrating a configuration of a reception signal replica generator according to the third embodiment.

FIG. 13 is a schematic block diagram illustrating the reception signal replica generator B3-r according to the third embodiment. In FIG. 13, the reception signal replica generator B3-r includes: IFFT units b312-t; GI inserters b313-t; a channel estimator b307; filter units b314-t; and a combiner 315.

The IFFT unit b312-t performs frequency-to-time conversion on the symbol replica received from the symbol replica generator b311-t, and outputs the generated time-domain replica signal to the GI inserter b313-t.

The GI inserter b313-t adds, for each signal in the FFT duration, a guard interval to the replica signal received from the IFFT unit b312-t, and thereby generates a replica of the transmission signal. The GI inserter b313-t outputs the generated replica of the transmission signal to the channel estimator b307 and the filter unit b314-t.

The channel estimator b307 estimates a channel impulse response of the channel from the t-th antenna to the r-th antenna, in an OFDM symbol duration, based on the reception signal received from the receiver b302-r, and the replica signal of the transmission signal received from the GI inserter b313-t. In the case of the initial process, the channel estimator b307 receives no input (zero) from the GI inserter b313-t, and estimates, based on the previously-stored pilot signal and the reception signal received from the receiver b302-r, a channel impulse response varying with time in the OFDM symbol duration.

The channel estimator b307 outputs the estimated channel impulse response to the filter unit b314-t. Additionally, the channel estimator b307 performs time-to-frequency conversion on the estimated channel impulse response. The channel estimator b307 outputs to the reconstructors b308-r-1 and b308-*r*-2 and the demodulator b309, the frequency response that is a frequency-domain signal generated by the conversion.

Further, the channel estimator b307 generates a replica of the pilot signal from the estimated frequency response and the previously-stored pilot signal. The channel estimator b307 calculates the noise power based on the pilot signal in the reception signal and the generated replica of the pilot signal. Moreover, the channel estimator b307 calculates the power of ICI (referred to as the ICI power), based on the estimated frequency response and the pilot signal. The details of the processes of the channel estimator b307 calculating the noise power and the ICI power are explained later together with an operation principle. The channel estimator b307 outputs to the demodulator b309, the noise power and the ICI power which are calculated.

The filter unit b314-*t* generates a replica of the reception signal of the t-th stream received by the r-th antenna, based on the channel impulse response received from the channel estimator b307 and the replica of the transmission signal received from the GI inserter b313-*t*. The filter unit b314-*t* outputs the generated replica of the reception signal to the combiner b315.

The combiner b315 combines the replicas of the reception signal received from the filter unit b314-*t*, and thereby generates a replica of the reception signal received from the r-th antenna. The combiner b315 outputs the generated replica of the reception signal to the subtractor b303-*r*.

(Regarding Operation Principle)

Hereinafter, the operation principles of the reception device b3 are explained with reference to FIGS. 12 and 13.

The reception signal $r_{i,k,r}$ of the i-th symbol at the discrete time k, which is received by the receiver b302-*r*, can be expressed by the formulas (43) and (44).

[Formula 34]

$$r_{i,k,r} = \sum_{t=1}^{T}\sum_{d=0}^{D} h_{i,d,k,r,t} s_{i,k-d,t} + z_{i,k,r} \tag{43}$$

$$s_{i,k,t} = \frac{1}{\sqrt{N}}\sum_{n=0}^{N-1} S_{i,n,t}\exp\left[j\frac{2\pi n}{N}(k - N_g)\right] \tag{44}$$

Here, T denotes the number of antennas of the transmission device a3. D denotes the maximum channel number. $h_{i,d,k,r,t}$ denotes a complex amplitude at the discrete time k of the i-th symbol with respect to the d-th path from the t-th antenna to the r-th antenna. Additionally, $s_{i,k,t}$ denotes a time-domain transmission signal of the i-th symbol in the t-th stream. $z_{i,k,r}$ denotes a time-domain noise of the i-th symbol with respect to the r-th antenna.

Further, N denotes the number of points in the FFT duration. $S_{i,n,t}$ denotes a modulation signal of the n-th subcarrier carrying the i-th symbol in the t-th stream. $N_g$ denotes the number of points in the GI duration. j denotes the imaginary unit.

[Regarding Iteration Process (within-Gi Delay Process)]

The subtractor b303-*r* subtracts the replica of the reception signal from the reception signal $r_{i,k,r}$ expressed by the formula (43). The FFT duration extractor b305-*r*-1 removes the GI from the signal in the FFT duration, which is generated by the subtraction. The FFT unit b306-*r*-1 performs time-to-frequency conversion on the signal from which the GI is removed. The signal $R'_{i,n,r}$ output from the FFT unit b306-*r*-1 can be expressed by the following formulas (45) and (46).

[Formula 35]

$$R'_{i,n,r} = \sum_{t=1}^{T}\sum_{m=0}^{N-1} W_{i,n,m,r,t}(S_{i,m,t} - S''_{i,m,t}) + Z_{i,n,r} \tag{45}$$

$$W_{i,n,m,r,t} = \tag{46}$$
$$\frac{1}{N}\sum_{d=0}^{D}\sum_{k=N_g}^{N_g+N-1} h_{i,d,k,r,t}\exp\left[-j\frac{2\pi(n-m)}{N}(k - N_g)\right]\exp\left(-j\frac{2\pi n}{N}d\right)$$

Here, $W_{i,n,m,r,t}$ denotes a leaking coefficient of the signal leaking from the m-th subcarrier into the n-th subcarrier with respect to the i-th symbol in the t-th stream received by the r-th antenna. When m=n, the leaking coefficient $W_{i,n,m,r,t}$ corresponds to the frequency response. Additionally, $S''_{i,n,t}$ denotes a symbol replica of the signal on the m-th subcarrier with respect to the t-th stream.

The reconstructor b308-*r*-1 multiplies the symbol replica $S''_{i,n,t}$ by the frequency response $W_{i,n,n,r,t}$ received from the channel estimator b307, and thereby generates the replica signal $W_{i,n,n,r,t}S''_{i,n,t}$ of the desired signal with respect to the n-th subcarrier carrying the i-th symbol in the t-th stream, which is affected by the channel and received by the r-th antenna. The reconstructor b308-*r*-1 adds the generated replica signal $W_{i,n,n,r,t}S''_{i,m,t}$ to the signal $R'_{i,n,r}$ expressed by the formula (45). In other words, the reconstructor b308-*r*-1 extracts subcarrier elements of the frequency-domain signal generated by the FFT unit b306-*r*-1 performing the conversion, and adds to the signals on the subcarrier elements, the elements of the desired stream among the subcarrier elements of the replica signal of the desired signal. The signal $Y_{i,n,r,t}$ generated by the addition can be expressed by the following formula (47).

[Formula 36]

$$Y_{i,n,r,t} = R'_{i,n,r} + W_{i,n,n,r,t}S''_{i,n,t} \tag{47}$$

$$= W_{i,n,n,r,t}S_{i,n,t} + \sum_{u=1}^{T}\sum_{m=0,m\ne n}^{N-1} W_{i,n,m,r,u}(S_{i,m,u} - S''_{i,m,u}) +$$

$$\sum_{u=0,u\ne t}^{T} W_{i,n,n,r,u}(S_{i,n,u} - S''_{i,n,u}) + Z_{i,n,r}$$

Here, the third term of the formula (47) indicates that signals of the other streams are cancelled, and therefore the formula (47) indicates that MIMO separation is performed.

The demodulator b309 calculates the demodulation symbol $S'_{i,n,t}$ on the n-th subcarrier with respect to the t-th stream, using the formula (48). Here, the formula (48) is a formula when cancelling residual is subjected to the noise approximation, and powers of the demodulation symbols are normalized to 1.

[Formula 37]

$$S'_{i,n,t} = \frac{\sum_{r=1}^{R} W^*_{i,n,n,r,t} Y_{i,n,r,t}}{\sum_{r=1}^{R} W^*_{i,n,n,r,t} W_{i,n,n,r,t} + \sigma_z^2 + \sigma_{I'}^2} \tag{48}$$

[Regarding Iteration Process (Over-GI Delay Process)]

The signal $R'_{i,n,r,1}$ output from the FFT unit b306-r-1 and the signal $R'_{i,n,r,2}$ output from the FFT unit b306-r-2 can be expressed by the formulas (49) and (50).

[Formula 38]

$$R'_{i,n,r,1} = \qquad (49)$$
$$\sum_{t=1}^{T} W_{i,n,n,r,t,1}(S_{i,n,t} - S''_{i,n,t}) + \sum_{t=1}^{T} \sum_{m=0,m\neq n}^{N-1} W_{i,n,m,r,t,1}(S_{i,m,t} - S''_{i,m,t}) +$$
$$\sum_{t=1}^{T} \sum_{m=0,m\neq n}^{N-1} V_{i,n,m,r,t,1}(S_{i-1,m,t} - S''_{i-1,m,t}) + Z_{i,n,r,1}$$

$$R'_{i,n,r,2} = \qquad (50)$$
$$\sum_{t=1}^{T} W_{i,n,n,r,t,2}(S_{i,n,t} - S''_{i,n,t}) + \sum_{t=1}^{T} \sum_{m=0,m\neq n}^{N-1} W_{i,n,m,r,t,2}(S_{i,m,t} - S''_{i,m,t}) +$$
$$\sum_{t=1}^{T} \sum_{m=0,m\neq n}^{N-1} V_{i,n,m,r,t,2}(S_{i+1,m,t} - S''_{i+1,m,t}) + Z_{i,n,r,2}$$

Here, $Z_{i,n,r,1}$ denotes noise in the front FFT duration with respect to the r-th antenna, which has been subjected to time-to-frequency conversion. $Z_{i,n,r,2}$ denotes noise in the rear FFT duration with respect to the r-th antenna, which have been subjected to time-to-frequency conversion. Additionally, $V_{i,n,m,r,t,1}$ is a coefficient of ISI caused by the previous and next symbols in the front FFT duration of the t-th stream received by the r-th antenna. $V_{i,n,m,r,t,2}$ is a coefficient of ISI caused by the previous and next symbols in the rear FFT duration of the t-th stream received by the r-th antenna. $V_{i,n,m,r,t,1}$ and $V_{i,n,m,r,t,2}$ indicate the leaking coefficients of leaking from the m-th subcarrier into the n-th subcarrier. Further, $W_{i,n,m,r,t,1}$ and $W_{i,n,m,r,t,2}$ denote frequency responses in the front FFT duration and the rear FFT duration of the t-th stream received by the r-th antenna, which can be expressed by the following formula (51) and (52), respectively.

[Formula 39]

$$W_{i,n,n,r,t,1} = \sum_{d=0}^{D} a_{N_g+d}\left(\frac{1}{N}\sum_{k=d}^{N-1} h_{i,d,k,r,t}\right)\exp\left[-j\frac{2\pi n}{N}(d+N_g)\right] \qquad (51)$$

$$W_{i,n,n,r,t,2} = \sum_{d=0}^{D} a_{d-D}\left(\frac{1}{N}\sum_{k=N_g+D}^{N_g+N+d-1} h_{i,d,k,r,t}\right)\exp\left[-j\frac{2\pi n}{N}(d-D)\right] \qquad (52)$$

The reconstructors b308-r-1 and b308-r-2 multiply the symbol replica $S''_{i,n,t}$ by the frequency responses $W_{i,n,n,r,t,1}$ and $W_{i,n,n,r,t,2}$ to generate the replica signals $W_{i,n,n,r,t,1}S''_{i,n,t}$ and $W_{i,n,n,r,t,2}S''_{i,n,t}$ of the desired signal affected by the channel, respectively. The reconstructor b308-r-1 adds the generated replica signal $W_{i,n,n,r,t,1}S''_{i,n,t}$ to the signal $R'_{i,n,r,1}$ expressed by the formula (49). The reconstructor b308-r-2 adds the generated replica signal $W_{i,n,n,r,t,2}S''_{i,n,t}$ to the signal $R'_{i,n,r,2}$ expressed by the formula (50). The signals $Y_{i,n,r,t,1}$ and $Y_{i,n,r,t,2}$ generated by the addition can be expressed by the following formulas (53) and (54), respectively.

[Formula 40]

$$Y_{i,n,r,t,1} = R'_{i,n,r,1} + W_{i,n,n,r,t,1}S''_{i,n,t} \qquad (53)$$
$$= W_{i,n,n,r,t,1}S_{i,n,t} + \sum_{u=1,u\neq t}^{T} W_{i,n,n,r,u,1}(S_{i,n,u} - S''_{i,n,u}) +$$
$$\sum_{m=0,m\neq n}^{N-1} W_{i,n,m,r,t,1}(S_{i,m,t} - S''_{i,m,t}) +$$
$$\sum_{m=1}^{N-1} V_{i,n,m,r,t,1}(S_{i-1,m,t} - S''_{i-1,m,t}) + Z_{i,n,r,1}$$

$$Y_{i,n,r,t,2} = R'_{i,n,r,2} + W_{i,n,n,r,t,2}S''_{i,n,t} \qquad (54)$$
$$= W_{i,n,n,r,t,2}S_{i,n,t} + \sum_{u=1,u\neq t}^{T} W_{i,n,n,r,u,2}(S_{i,n,u} - S''_{i,n,u}) +$$
$$\sum_{m=0,m\neq n}^{N-1} W_{i,n,m,r,t,2}(S_{i,m,t} - S''_{i,m,t}) +$$
$$\sum_{m=0}^{N-1} V_{i,n,m,r,t,2}(S_{i-1,m,t} - S''_{i-1,m,t}) + Z_{i,n,r,2}$$

The demodulator b309 calculates demodulation symbols $S'_{i,n,t}$ on the n-th subcarrier with respect to the t-th stream, using the formula (55). Here, the formula (55) is a formula when the cancelling residual is subjected to noise approximation, and the powers of the demodulation symbols are normalized to 1.

[Formula 41]

$$S'_{i,n,t} = \sum_{r=1}^{R} \frac{W^H_{i,n,n,r,t}}{\sum_{r=1}^{R} W^H_{i,n,n,r,t}W_{i,n,n,r,t} + \sigma_z^2 + \sigma_{I'}^2} Y_{i,n,r,t} \qquad (55)$$

Here, the vector $V_{i,n,r,t}$ and the vector $W_{i,n,m,r,t}$ can be expressed by the following formulas (56) and (57).

[Formula 42]

$$Y_{i,n,r,t} = (Y_{i,n,r,t,1} Y_{i,n,r,t,2})^T \qquad (56)$$

$$W_{i,n,m,r,t} = (W_{i,n,m,r,t,1} W_{i,n,m,r,t,2})^T \qquad (57)$$

(Regarding Operation of Reception Device b3)

Figure 14:
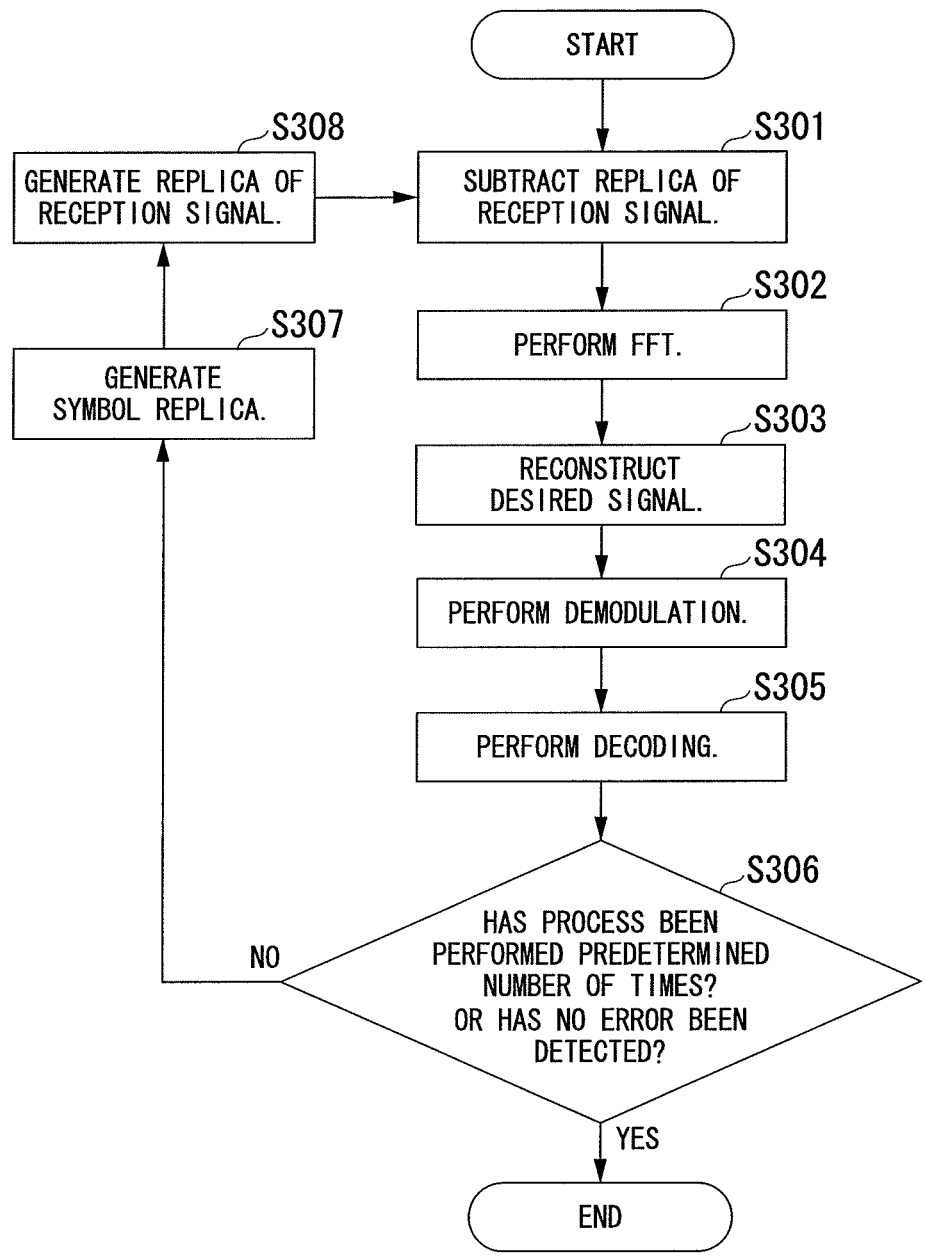
FIG. 14 is a flowchart illustrating operations of the reception device according to the third embodiment.

FIG. 14 is a flowchart illustrating operations of the reception device b3 according to the third embodiment. The operations shown in FIG. 14 are processes after the receiver b302-r shown in FIG. 12 outputs the reception signal to the subtractor b303-r for the first time.

(Step S301) The subtractor b303-r subtracts from the reception signal, the replica of the reception signal generated in step S308 that will be explained later. Thereafter, the routine proceeds to step S302.

(Step S302) The FFT units b306-r-1 and b306-r-2 perform time-to-frequency conversion on signals in the FFT duration selected by the duration selector b304-r from among the signals generated by the subtraction in step S301. Thereafter, the routine proceeds to step S303.

(Step S303) For each subcarrier, the reconstructors b308-r-1 and b308-r-2 add to the signals generated by the conversion in step S302, replica signals generated by multiplying the symbol replicas generated in step S307 that will be explained later, by the frequency responses of the signals in the FFT duration selected by the duration selector b304-r. Thereafter, the routine proceeds to step S304.

(Step S304) The demodulator b309 performs channel compensation on the signals generated by the addition in step S303, and thereby calculates bit log likelihood ratios. Thereafter, the routine proceeds to step S305.

(Step S305) The decoder b310-t performs a decoding process, such as error correction, on the bit log likelihood ratios generated by the calculation in step S304. Thereafter, the routine proceeds to step S306.

(Step S306) The decoder b310-t determines whether no errors are detected in the results of the decoding in step S305, or whether the process has been performed the predetermined number of time. If Yes to either determination (YES), the reception device b3 terminates the operations. On the other hand, if No to both determinations (NO), the routine proceeds to step S307.

(Step S307) The symbol replica generator b311-t generates symbol replicas from the bit log likelihood ratios generated by the decoding in step S305. Thereafter, the routine proceeds to step S308.

(Step S308) The reception signal replica generator B3-r generates a replica of the reception signal based on the symbol replicas generated in step S307. Thereafter, the routine proceeds to step S301.

Thus, according to the third embodiment, the reception device b3 extracts each subcarrier element of the reception signal from which the ISI and the ICI are cancelled. Then, the reception device b3 demodulates the signal on the extracted subcarrier element. Thereby, the reception device b3 can prevent an increase in the amount of calculation even in the case of the MIMO transmission.

In the third embodiment, the reception device b3 does not reconstruct signals of another stream even if the signals are on the desired subcarriers, but may reconstruct the signals of the other stream. In other words, the third term of the formulas (47), (53), and (54) may be reconstructed. In this case, the demodulator performs MIMO separation. Therefore, it is possible to perform not only a linear process such as ZF or MMSE, but also a non-linear process such as maximum likelihood detection (MLD) (hereinafter, MLD means the maximum likelihood detection).

Hereinafter, the principle of a process for the reception device b3 to calculate bit log likelihood ratios using the MLD when the signals of the other stream are also reconstructed is explained. Although the case in which the over-GI delay process is performed is explained here, the within-GI delay process can be performed in a similar manner.

The reconstructor b308-r-1 adds, for all t, the generated replica signal $W_{i,n,n,r,t,1} S''_{i,m,t,1}$ to the signal $R'_{i,n,r,1}$ expressed by the formula (49). In other words, the reconstructor b308-r-1 extracts subcarrier elements of the frequency-domain signal generated by the FFT unit b306-r-1 performing the conversion. Then, the reconstructor b308-r-1 adds to the signals on the extracted subcarrier elements, all the stream elements among the subcarrier elements of the replica signal of the desired signal. The signals $Y_{n,r,t,1}$ and $Y_{n,r,t,2}$ generated by the addition can be expressed by the following formulas (58) to (60).

[Formula 43]

$$Y_{i,n,r,1} = R'_{i,n,r,1} + \sum_{t=1}^{T} W_{i,n,n,r,t,1} S''_{i,n,t} \quad (58)$$

$$= \sum_{t=1}^{T} W_{i,n,n,r,t,1} S_{i,n,t} +$$

$$\sum_{u=1}^{T} \sum_{m=0, m\neq n}^{N-1} W_{i,n,m,r,u,1}(S_{i,m,u} - S''_{i,m,u}) + Z_{i,n,r,1}$$

$$= \sum_{t=1}^{T} W_{i,n,n,r,t,1} S_{i,n,t} + Z'_{i,n,r,1}$$

$$Y_{i,n,r,2} = R'_{i,n,r,2} + \sum_{t=1}^{T} W_{i,n,n,r,t,2} S''_{i,n,t} \quad (59)$$

$$= \sum_{t=1}^{T} W_{i,n,n,r,t,2} S_{i,n,t} +$$

$$\sum_{u=1}^{T} \sum_{m=0, m\neq n}^{N-1} W_{i,n,m,r,u,2}(S_{i,m,u} - S''_{i,m,u}) + Z_{i,n,r,2}$$

$$= \sum_{t=1}^{T} W_{i,n,n,r,t,2} S_{i,n,t} + Z'_{i,n,r,2}$$

$$Z'_{i,n,r,1} = \sum_{u=1}^{T} \sum_{m=0, m\neq n}^{N-1} W_{i,n,m,r,u,1}(S_{i,m,u} - S''_{i,m,u}) + Z_{i,n,r,1} \quad (60)$$

$$Z'_{i,n,r,2} = \sum_{u=1}^{T} \sum_{m=0, m\neq n}^{N-1} W_{i,n,m,r,u,2}(S_{i,m,u} - S''_{i,m,u}) + Z_{i,n,r,2} \quad (61)$$

These formulas (58) to (60) can be expressed in vector notation by the following formulas (62) to (65).

[Formula 44]

$$Y_{i,n} = (Y_{i,n,1,1} \cdots Y_{i,n,R,1} \; Y_{i,n,1,2} \cdots Y_{i,n,R,2})^T \quad (62)$$
$$= H_{i,n} S_{i,n} + Z_{i,n}$$

$$H_{i,n} = \begin{pmatrix} W_{i,n,n,1,1,1} & \cdots & W_{i,n,n,1,T,1} \\ \vdots & \ddots & \vdots \\ W_{i,n,n,R,1,1} & \cdots & W_{i,n,n,R,T,1} \\ W_{i,n,n,1,1,2} & \cdots & W_{i,n,n,1,T,2} \\ \vdots & \ddots & \vdots \\ W_{i,n,n,R,1,2} & \cdots & W_{i,n,n,R,T,2} \end{pmatrix} \quad (63)$$

$$S_{i,n} = (S_{i,n,1} \cdots S_{i,n,T})^T \quad (64)$$

$$Z_{i,n} = (Z'_{i,n,1,1} \cdots Z'_{i,n,R,1} \; Z'_{i,n,1,2} \cdots Z'_{i,n,R,2})^T \quad (65)$$

Here, bit stream $\beta_{i,n}$ included in vector $S_{i,n}$ shown in the formula (64) is defined by the following formula (66).

[Formula 45]

$$\beta_{i,n} = [b_{i,n,1,0} \cdots b_{i,n,1,M-1} \cdots b_{i,n,T,M-1}] \quad (66)$$

Here, M denotes the modulation level. For example, M=2 when QPSK, M=4 when 16QAM. Additionally, $b_{i,n,t,q}$ denotes the q-th bit of the t-th stream included in the vector $S_{i,n}$. Hereinafter, explanations are given with respect to the i-th symbol on the n-th subcarrier, the suffixes i and n are omitted. In other words, $\beta_{i,n}$ is denoted as $\beta$, and $b_{i,n,t,q}$ is denoted as $b_{t,q}$. The bit log likelihood ratio $\lambda(b_{i,t,q})$ of the bit $b_{i,t,q}$ in the formula (66) can be expressed by the following formula (67).

[Formula 46]

$$\lambda(b_{t,q}) = \log \frac{p(b_{t,q}=0 \mid Y_{i,n})}{p(b_{t,q}=1 \mid Y_{i,n})} \quad (67)$$

$$= \log \frac{\sum_{\beta, b_{t,q}=0} p(\beta \mid Y_{i,n})}{\sum_{\beta, b_{t,q}=1} p(\beta \mid Y_{i,n})}$$

p(A|B) indicates conditional probability of A with respect to B.

$\Sigma_{\beta, b_{t,q}=0} p(\beta|Y_{i,n})$ indicates that only $b_{t,q}$ is 0, and a sum of a value when the other bit is 0 and a value when the other bit is 1 is calculated.

When the Bayes' theorem p(A|B)p(B)=p(B|A)p(A) is used, the bit log likelihood ratio $\lambda(b_{t,q})$ in the formula (67) can be expressed by the following formula (68).

[Formula 47]

$$\lambda(b_{t,q}) = \log \frac{\sum_{\beta, b_{t,q}=0} p(Y_{i,n} \mid \beta) p(\beta)}{\sum_{\beta, b_{t,q}=1} p(Y_{i,n} \mid \beta) p(\beta)} \quad (68)$$

If it is assumed that $Z'_{i,n,r}$ follows the Gauss process and if Max-log approximation is used, the bit log likelihood ratio $\lambda(b_{t,q})$ in the formula (68) can be expressed by the following formula (69).

[Formula 48]

$$\lambda(b_{t,q}) = \max_{\beta, b_{t,q}=0} \left[ \frac{1}{\sigma_{z'}^2} (-\|Y_{i,n} - H_{i,n} S_{i,n}\|^2) + \log p(\beta) \right] - \max_{\beta, b_{t,q}=1} \left[ \frac{1}{\sigma_{z'}^2} (-\|Y_{i,n} - H_{i,n} S_{i,n}\|^2) + \log p(\beta) \right] \quad (69)$$

If each bit is assumed to be independent, $p(\beta)$ in the formula (69) can be expressed by the following formula (70).

[Formula 49]

$$p(\beta) = \prod_{t',q', t' \neq t, q' \neq q} p(b_{t',q'}) \quad (70)$$

Here, $p(b_{t',q'})$ can be calculated using the bit log likelihood ratio $\lambda_a(b_{t',q'})$ output from the decoder b310-t'. Additionally, the bit log likelihood ratio $\lambda(b_{t,q})$ obtained in such a manner is calculated using the bit log likelihood ratio $\lambda_a(b_t, q)$, and therefore it is general to subtract that amount. In other words, the value that the demodulator b309 outputs to the decoder b310-t is $\lambda(b_{t,q}) - \lambda_a(b_{t,q})$.

For simplification, LLR may be calculated assuming that there is no preliminary information. In this case, the bit log likelihood ratio $\lambda(b_{t,q})$ can be expressed by the following formula (71).

[Formula 50]

$$\lambda(b_{t,q}) = \max_{\beta, b_{t,q}=0} \left[ \frac{1}{\sigma_{z'}^2} (-\|Y_{i,n} - H_{i,n} S_{i,n}\|^2) \right] - \max_{\beta, b_{t,q}=1} \left[ \frac{1}{\sigma_{z'}^2} (-\|Y_{i,n} - H_{i,n} S_{i,n}\|^2) \right] \quad (71)$$

The demodulator b309 calculates the bit log likelihood ratio $\lambda(b_{t,q})$, which is the result of the demodulation, using the formula (71), and outputs the result to the decoder b310-t.

In the third embodiment, the reception device b3 selects two FFT durations, which are the front FFT duration and the rear FFT duration. However, the reception device b3 may select three or more durations as in the second embodiment. Alternatively, the reception device b3 may select the positions of the FFT durations as shown in FIG. 10.

Additionally, in the third embodiment, the transmission device a3 (FIG. 11) includes one encoder a302-t for one antenna a308-t. However, the present invention is not limited thereto, and one encoder may be included for multiple antennas. For example, the transmission device a3 may include one encoder, assign the results of the error correction coding to the modulators a303-1 to a303-t according to a predetermined pattern, and thus output the results.

Further, in the third embodiment, the first to T-th streams may include transmission signals of the same information data signal stream. Alternatively, the first to T-th streams may include transmission signals of different information data signal streams. For example, if the transmission device a3 transmits two information data signal streams, the transmission device a3 may transmit one of the information data streams as first and second streams, and transmit the other one of the information data streams as third and fourth streams.

Explanations have been given in the above embodiments with respect to the cases in which the reception devices b1, b2, and b3 subtract the replica of the reception signal from the reception signal in the time domain. However, the present invention is not limited thereto, and the replica of the reception signal may be subtracted from the reception signal in the frequency domain. In this case, for example, regarding the reception device b1, the receiver b102 outputs the reception signal to the FFT duration extractors b105-1 and b105-2, and the filter unit b114 outputs the replica of the reception signal to the FFT duration extractors b105-1 and b105-2. The FFT duration extractors b105-1 and b105-2 extract signals in the FFT duration specified by the selected duration information, from the reception signal received from the receiver b102 and the replica of the reception signal received from the filter unit b114. The FFT units b106-1 and b106-2 perform time-to-frequency conversion on the signals extracted by the FFT duration extractors b105-1 and b105-2, respectively. The reconstructors b108-1 and b108-2 subtract the replica of the reception signal from the reception signal in the FFT duration for which the FFT duration extractors b105-1 and b105-2 perform time-to-frequency conversion, respectively. The reconstructors b108-1 and b108-2 add the replica signals while regarding the signals generated by the subtraction as the signals $R'_{i,n,1}$ and $R'_{i,n,2}$ in the formulas (20) and (22).

Additionally, explanations have been given in the above embodiments with respect to the cases in which the duration selectors b104, b204, and b304-r determine whether or not there is a delayed path whose delay exceeds the GI. However, the present invention is not limited thereto, and the duration selectors b104, b204, and b304-r need not determine whether or not there is a delayed path whose delay exceeds the GI. In this case, the reception devices b1, b2, and b3 perform only the over-GI delay process without performing the within-GI delay process.

Further, explanations have been given in the above embodiments with respect to the cases in which the reconstructors b108-1, b108-2, b207, b308-r-1, and b308-r-2 (hereinafter referred to simply as reconstructors) extract subcarrier elements of the frequency-domain signals converted by the FFT units b106-1, b106-2, b205, b306-r-1, and b306-r-2 (hereinafter referred to simply as FFT units), and add subcarrier elements of the replica signals of the desired signal, to the extracted subcarrier elements. However, the present invention is not limited thereto, and the reconstructors may generate replica signals of the desired signal leaking from the n-th subcarrier to the (n+1)-th subcarrier (l=1, −1, 2, −2, . . . , L, −L), and add the generated replica signals to the n-th subcarrier for the frequency-domain signals converted by the FFT units. In other words, the reconstructors extract subcarrier elements of the frequency-domain signals converted by the FFT units, add to the signals on the extracted subcarrier elements, elements of the subcarriers close to the subcarriers for the replica signals of the desired signal.

In this case, the demodulators b109, b208, and b309 calculate the demodulation symbol $S'_n$ on the n-th subcarrier, using the following formula (72). Here, the following formula (72) is a formula when cancelling residual is subjected to noise approximation, and the powers of demodulation symbols are normalized to 1.

[Formula 51]

$$S'_{i,n} = \frac{\sum_{l=-L}^{L} W^H_{i,n+l,n}}{\sum_{l=-L}^{L} W^H_{i,n+l,n} W_{i,n+l,n} + \sigma^2_z + \frac{2}{P'}} Y_{i,n,l} \quad (72)$$

where, $Y_{i,n,l} = (Y_{i,n,l,1} \quad Y_{i,n,l,2})^T$ $Y_{i,n,l} = R'_{i,n+l} + W_{i,n+l,n} S''_{i,n}$ A computer may implement part of the reception devices b1, b2, and b3 of the above embodiments, such as: the receivers b102 and b302-r; the subtractors b103 and b303-r; the FFT duration extractors b105-1, b105-2, b305-r-1, and b305-r-2; the FFT units b106-1, b106-2, b205, b306-r-1, and b306-r-2; the channel estimators b107, b206, and b307; the reconstructors b108-1, b108-2, b207, b308-r-1, and b308-r-2; the demodulator b109, b208, and b309; the decoders b110 and b310-t; the symbol replica generators b111 and b311-t; the IFFT units b112 and b312-t; the GI inserters b113 and b313-t; the filter units b114 and b314-t; and the combiner b315. In this case, a computer-readable recording medium may store a program for implementing these control functions, so that a computer system reads and executes the program stored in the recording medium and thereby implement the control functions. Here, the "computer systems" are computer systems included in the reception devices b1, b2, and b3, and include OS and hardware, such as a peripheral device. Additionally, the "computer readable recording medium" includes a portable medium such as a flexible disc, a magneto-optical disc, a ROM, and a CD-ROM, and a storage device such as a hard disk built in the computer system. Further, the "computer readable recording medium" may include a medium that dynamically stores a program for a short period of time, such as a communication line used when a program is transmitted via a network such as the Internet or a communication line such as a telephone line. Additionally, the "computer readable recording medium" may include a medium that stores a program for a predetermined period of time, such as a volatile memory built in a computer system serving as a server or client when the program is transmitted via a network such as the Internet or a communication line such as a telephone line. Moreover, the program may be a program for implementing part of the aforementioned functions. Further, the program may be a program that can implement the aforementioned functions in combination with a program already recorded in the computer system.

Embodiments of the present invention have been explained above in detail with reference to the drawings. However, the specific configuration is not limited thereto. Various modifications may be made without departing from the scope of the present invention.

INDUSTRIAL APPLICABILITY

The present invention is suited to be used for reception of wireless communication.

DESCRIPTION OF REFERENCE SYMBOLS

A, a1, a3: transmission device
B, b1, b2, b3: reception device
a101, a301-t: pilot generator
a102, a302-t: encoder
a103, a303-t: modulator
a104, a304-t: mapper
a105, a305-t: IFFT unit
a106, a306-t: GI inserter
a107, a307-t: transmitter
a108, a308-t: transmission antenna unit
b101, b301-r: reception antenna
b102, b302-r: receiver
b103, b303-r: subtractor
b104, b204, b304: duration selector
b105-1, b105-2, b105-i, b305-r-1, b305-r-2: FFT duration extractor
b106-1, b106-2, b106-i, b306-r-1, b306-r-2: FFT unit
b107, b307: channel estimator
b108-1, b108-2, b108-i, b308-r-1, b308-r-2: reconstructor
b109, b309: demodulator
b110, b310-t: decoder
b111, b311-t: symbol replica generator
b112, b312-t: IFFT unit
b113, b313-t: GI inserter
b114, b314-t: filter unit
B3-r: reception signal replica generator
b315: combiner

The invention claimed is:

1. A reception device configured to demodulate information from a reception signal, the reception device comprising:
   a channel estimator configured to estimate a plurality of channel impulse responses at a plurality of times in an orthogonal frequency division multiplexing (OFDM) symbol;
   a symbol replica generator configured to generate a symbol replica that is a modulation symbol of the information demodulated;
   a signal extractor configured to extract, in a plurality of frequency domains obtained from a plurality of time durations, each of subcarrier elements of the reception signal from which an inter-carrier interference is cancelled, based on the channel impulse responses and the symbol replica; and a demodulator configured to demodulate signals on the subcarrier elements in the plurality of frequency domains, which are extracted by the signal extractor, wherein the signal extractor is configured to estimate a plurality of frequency responses based on the plurality of channel impulse responses at the plurality of times, and the signal extractor comprises:

a filter unit configured to generate a reception signal replica that is a replica of the reception signal in a time domain, based on the plurality of channel impulse responses at the plurality of times and the symbol replica;

a subtractor configured to subtract the reception signal replica from the reception signal;

a plurality of duration extractors configured to extract signals in the plurality of time durations from a signal generated from subtraction by the subtractor;

a time-to-frequency converter configured to convert, into frequency domain signals, each of the signals in the plurality of time durations, which are extracted by the plurality of duration extractors; and a plurality of reconstructors configured to generate a plurality of replica signals of a desired signal based on the plurality of frequency responses and the symbol replica, add the plurality of replica signals of the desired signal to the frequency domain signals generated from conversion by the time-to-frequency converter, and extract, in the plurality of time durations, each of subcarrier elements of the reception signal.

2. The reception device according to claim 1, wherein the filter unit is configured to generate the reception signal replica based on the symbol replica subjected to frequency-to-time conversion and the plurality of channel impulse responses at the plurality of times.

3. The reception device according to claim 1, wherein the plurality of duration extractors is configured to set a start of one of two time durations from which signals are to be extracted, as corresponding to a start of a preceding wave, and set an end of the other one of the two time durations as corresponding to an end of a signal on a maximum delay path.

4. The reception device according to claim 1, wherein the plurality of reconstructors is configured to extract subcarrier elements of the frequency domain signals generated by conversion by the time-to-frequency converter, and add to signals on the subcarrier elements extracted, elements of subcarriers close to subcarriers corresponding to subcarrier elements of the plurality of replica signals of the desired signal.

5. The reception device according to claim 1, further comprising:

a plurality of antennas, wherein the reception device performs communication with a transmission device, using a multiple-input multiple-output (MIMO) transmission scheme.

6. The reception device according to claim 5, wherein the demodulator is configured to perform MIMO separation based on the plurality of channel impulse responses.

7. The reception device according to claim 6, wherein the reception device is configured to receive, as the reception signal, a plurality of signals of a plurality of streams that are signal streams transmitted from each of the plurality of antennas included in a transmission device, the signal extractor comprises:

a filter unit configured to generate a reception signal replica that is a replica of the reception signal in a time domain, based on the plurality of channel impulse responses and the symbol replica;

a subtractor configured to subtract the reception signal replica from the reception signal;

a plurality of duration extractors configured to extract signals in the plurality of time durations from a signal generated from subtraction by the subtractor;

a time-to-frequency converter configured to convert, into frequency domain signals, each of the signals in the plurality of time durations, which are extracted by the plurality of duration extractors; and a plurality of reconstructors configured to generate a plurality of replica signals of a desired signal based on the plurality of channel impulse responses and the symbol replica, add the plurality of replica signals of the desired signal to the frequency domain signals generated from conversion by the time-to-frequency converter, and extract, in the plurality of time durations, each of subcarrier elements of the reception signal, and the plurality of reconstructors is configured to extract subcarrier elements of the frequency domain signals generated from conversion by the time-to-frequency converter, and add to the subcarrier elements extracted, a desired stream element among the subcarrier elements of the plurality of replica signals of the desired signal.

8. The reception device according to claim 6, wherein the reception device is configured to receive, as the reception signal, a plurality of signals of a plurality of streams that are signal streams transmitted from each of the plurality of antennas included in a transmission device, the signal extractor comprises:

a filter unit configured to generate a reception signal replica that is a replica of the reception signal in a time domain, based on the plurality of channel impulse responses and the symbol replica;

a subtractor configured to subtract the reception signal replica from the reception signal;

a plurality of duration extractors configured to extract signals in the plurality of time durations from a signal generated from subtraction by the subtractor;

a time-to-frequency converter configured to convert, into frequency domain signals, each of the signals in the plurality of time durations, which are extracted by the plurality of duration extractors; and a plurality of reconstructors configured to generate a plurality of replica signals of a desired signal based on the plurality of channel impulse responses and the symbol replica, add the plurality of replica signals of the desired signal to the frequency domain signals generated from conversion by the time-to-frequency converter, and extract, in the plurality of time durations, each of subcarrier elements of the reception signal, and the plurality of reconstructors is configured to extract subcarrier elements of the frequency domain signals generated from conversion by the time-to-frequency converter, and add to the subcarrier elements extracted, all desired stream elements among the subcarrier elements of the plurality of replica signals of the desired signal.

9. A reception method for a reception device configured to demodulate information from a reception signal, the reception method comprising:

estimating a plurality of channel impulse responses at a plurality of times in an orthogonal frequency division multiplexing (OFDM) symbol;

generating a symbol replica that is a modulation symbol of the information demodulated;

extracting, in a plurality of frequency domains obtained from a plurality of time durations, each of subcarrier elements of the reception signal from which an inter-carrier interference is cancelled, based on the plurality of channel impulse responses and the symbol replica; and demodulating signals on the subcarrier elements in the plurality of frequency domains, which are extracted, wherein the reception method further comprises estimating a plurality of frequency responses based on the plurality of channel impulse responses at the plurality of times, and extracting each of subcarrier elements of the reception signal comprises:

generating a reception signal replica that is a replica of the reception signal in a time domain, based on the plurality of channel impulse responses at the plurality of times and the symbol replica;

subtracting the reception signal replica from the reception signal;

extracting signals in the plurality of time durations from a signal generated by subtracting the reception signal replica;

converting, into frequency domain signals, each of the signals in the plurality of time durations, which are extracted;

generating a plurality of replica signals of a desired signal based on the plurality of frequency responses and the symbol replica, add the plurality of replica signals of the desired signal to the frequency domain signals generated from conversion by the time-to-frequency converter; and extracting, in the plurality of time durations, each of subcarrier elements of the reception signal.

* * * * *